Figure 27:
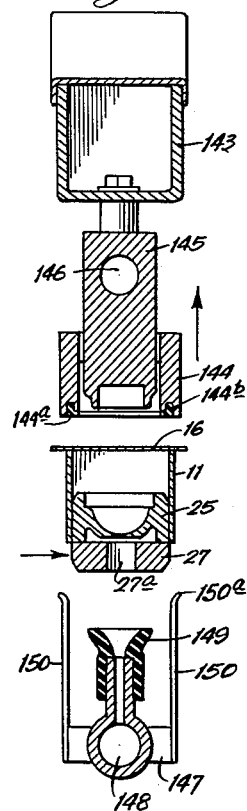

May 8, 1962 L. PETERS 3,033,737
APPARATUS FOR FORMING CONTAINERS EQUIPPED
WITH A REVERSIBLE POCKET OF
THERMOPLASTIC FILM
Filed June 21, 1957 17 Sheets-Sheet 1
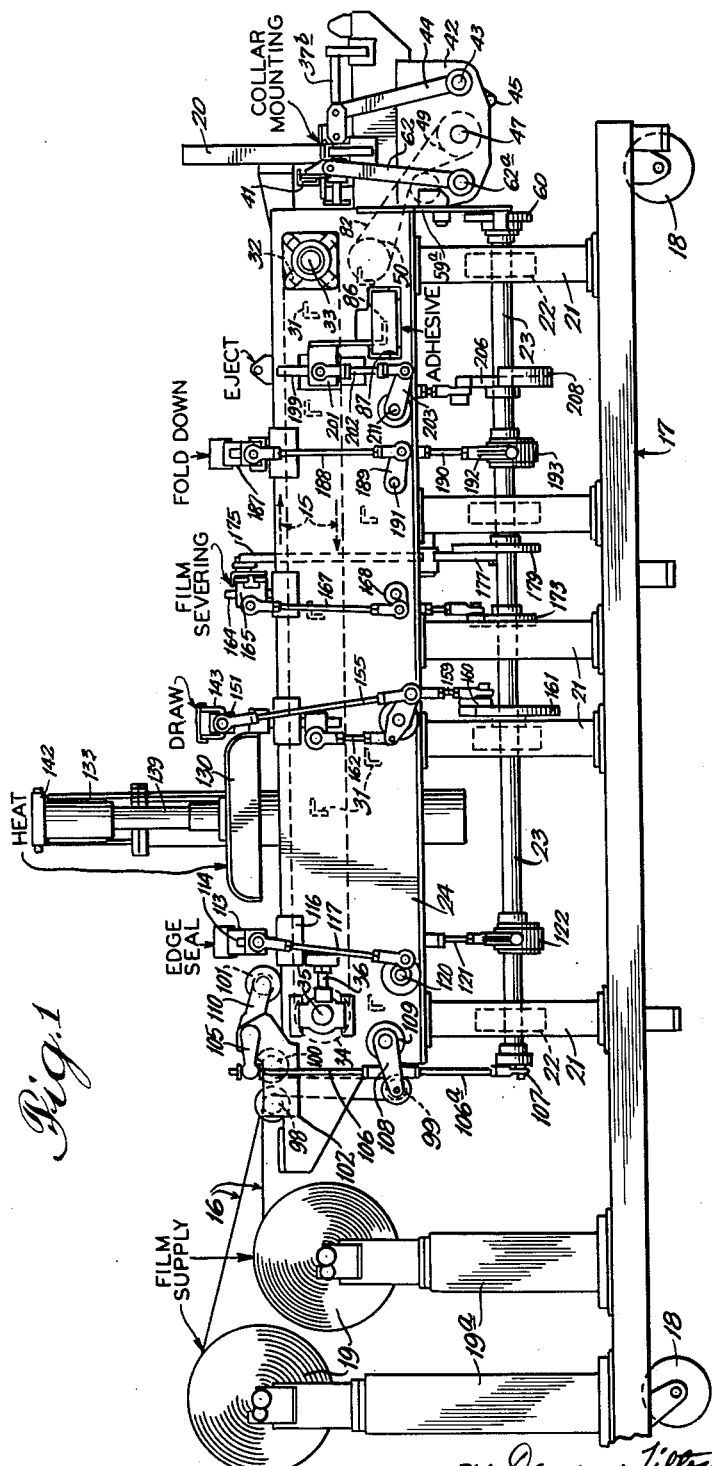
INVENTOR:
Leo Peters,
BY Dawson, Tilton, Fallon & Lungmus,
ATTORNEYS.

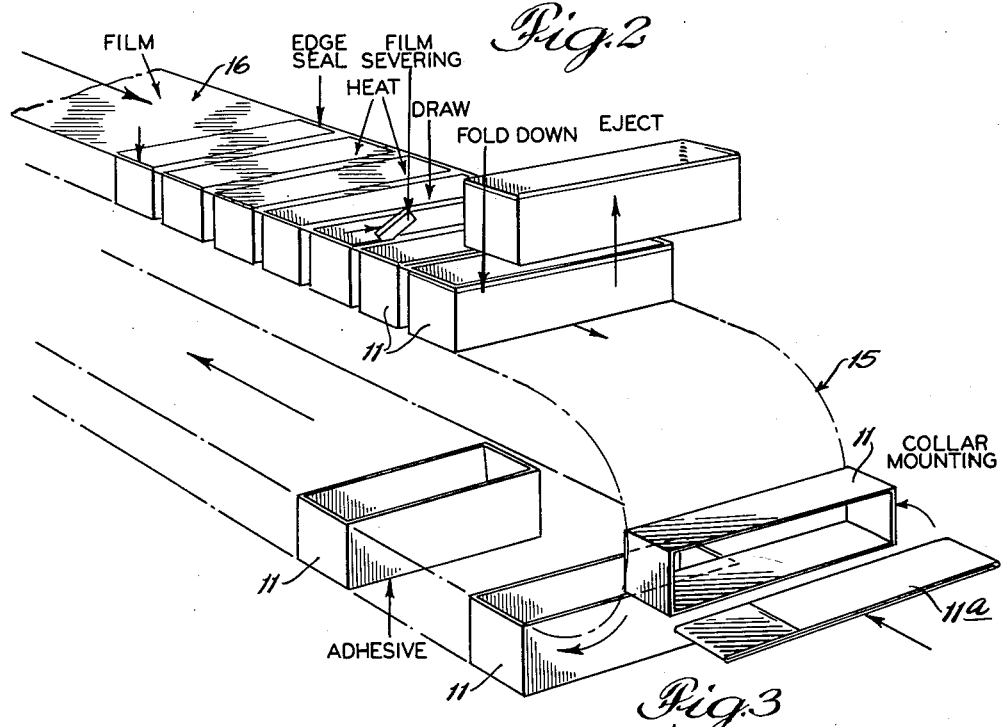
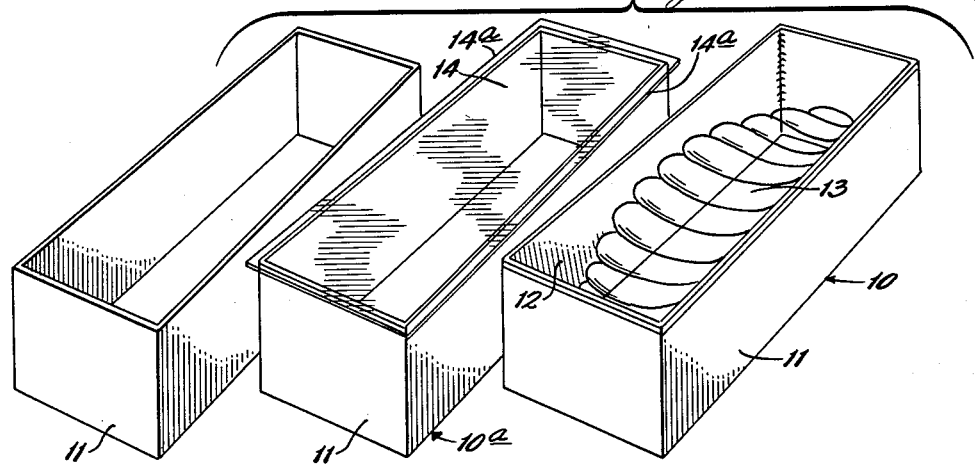

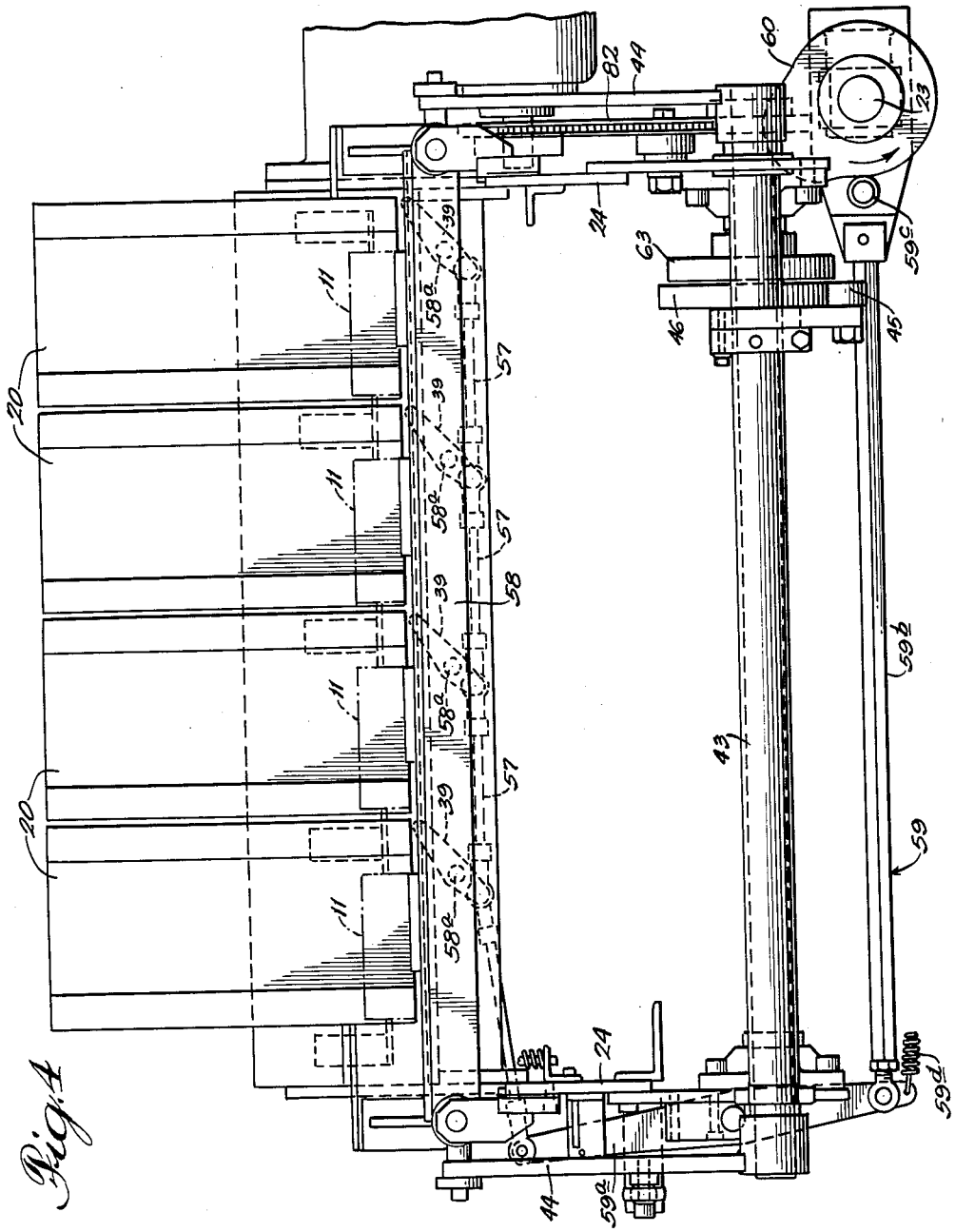

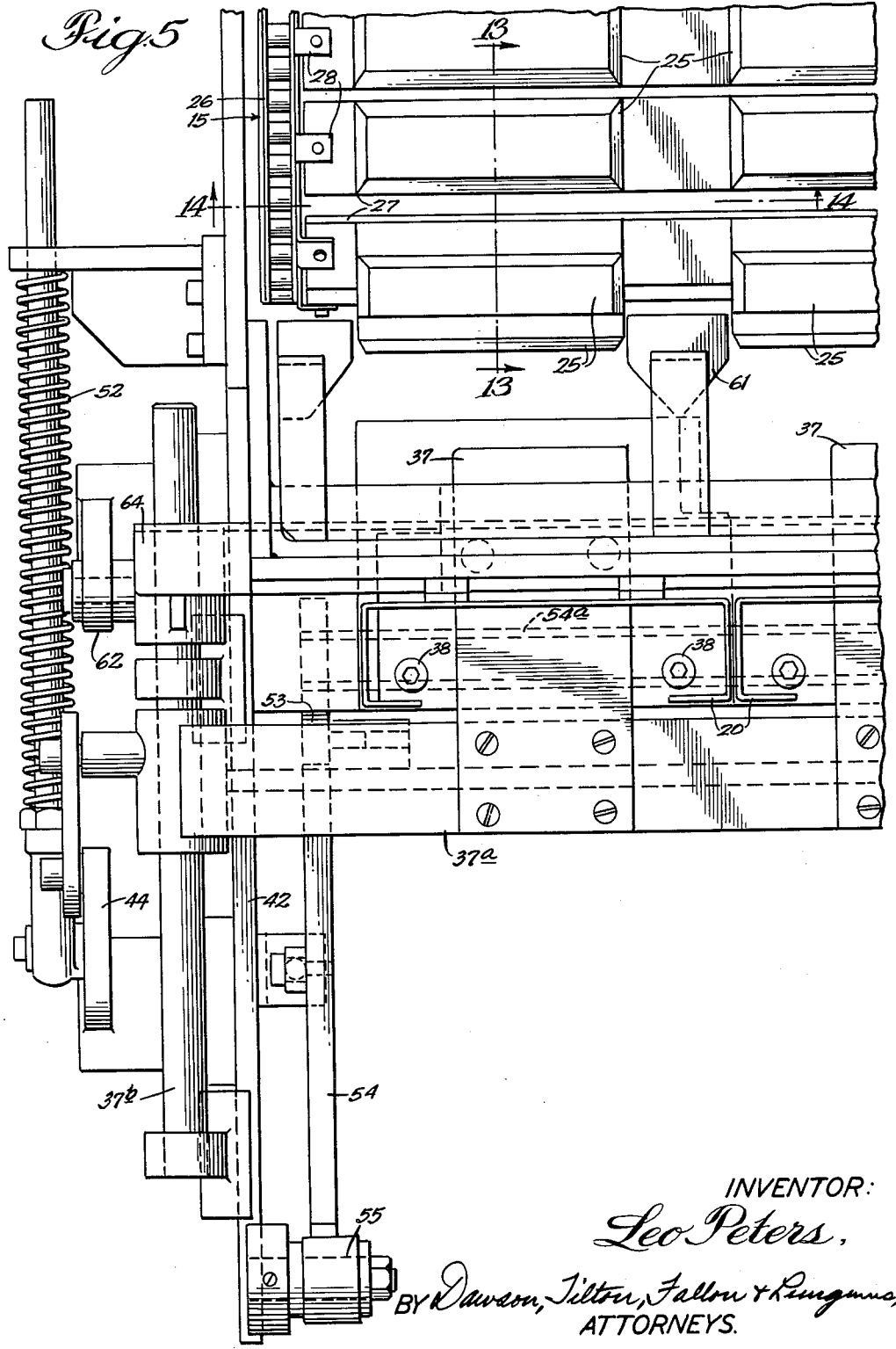

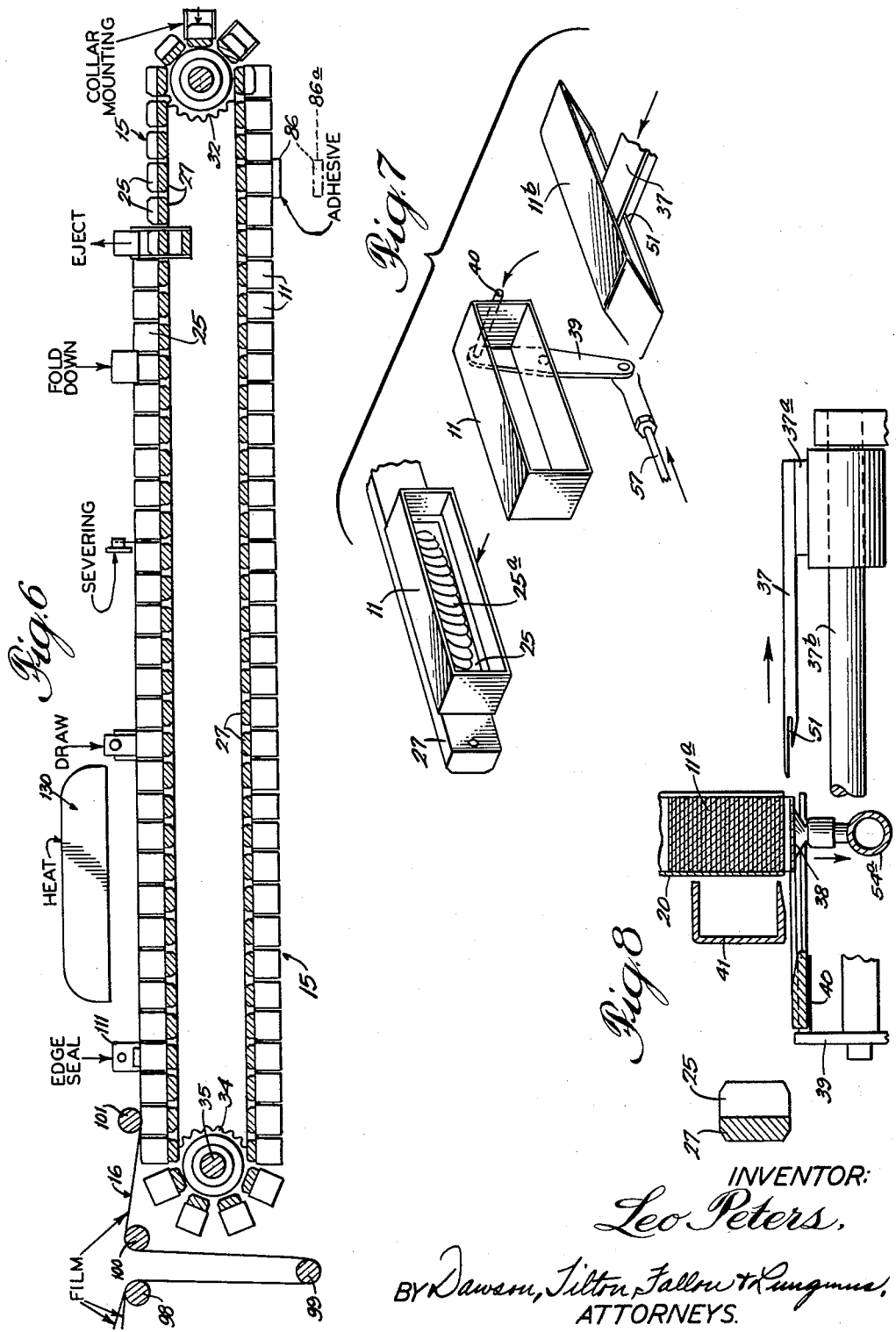

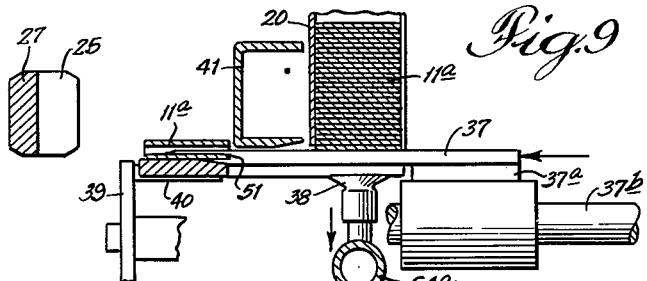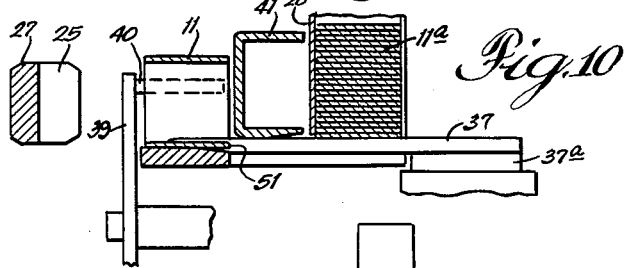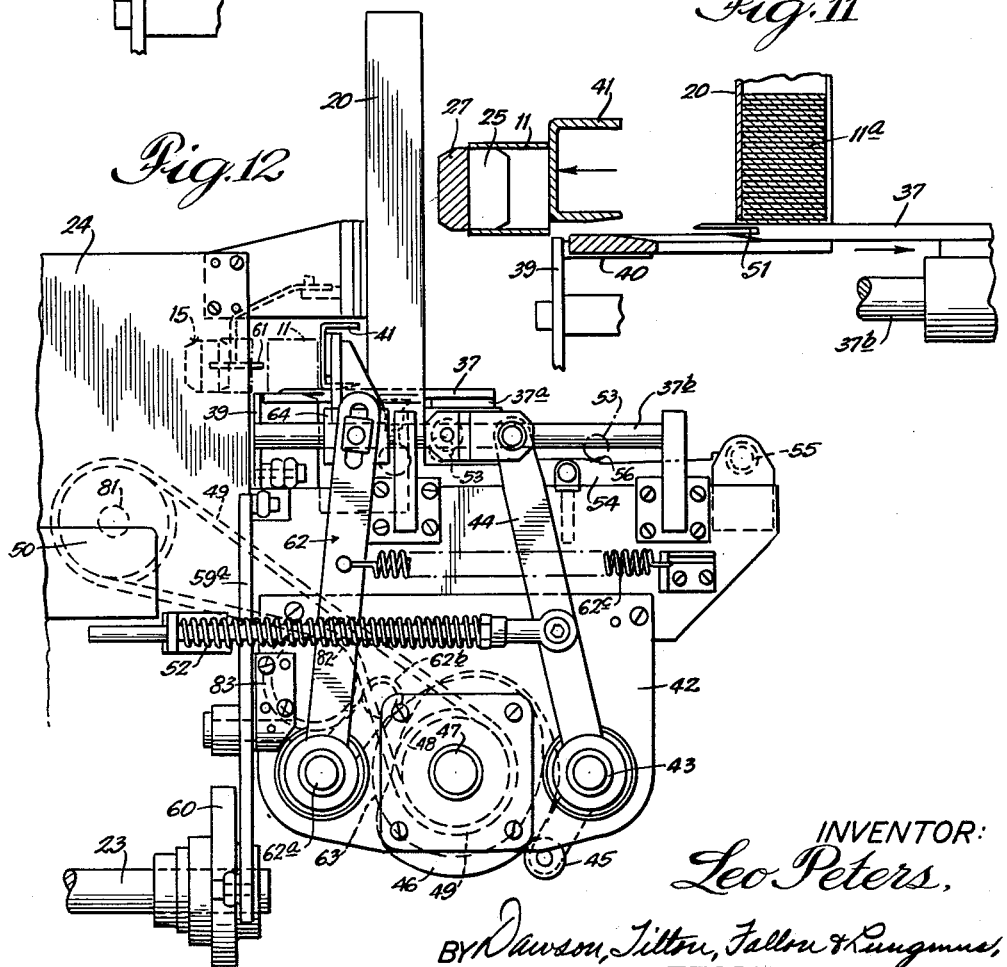

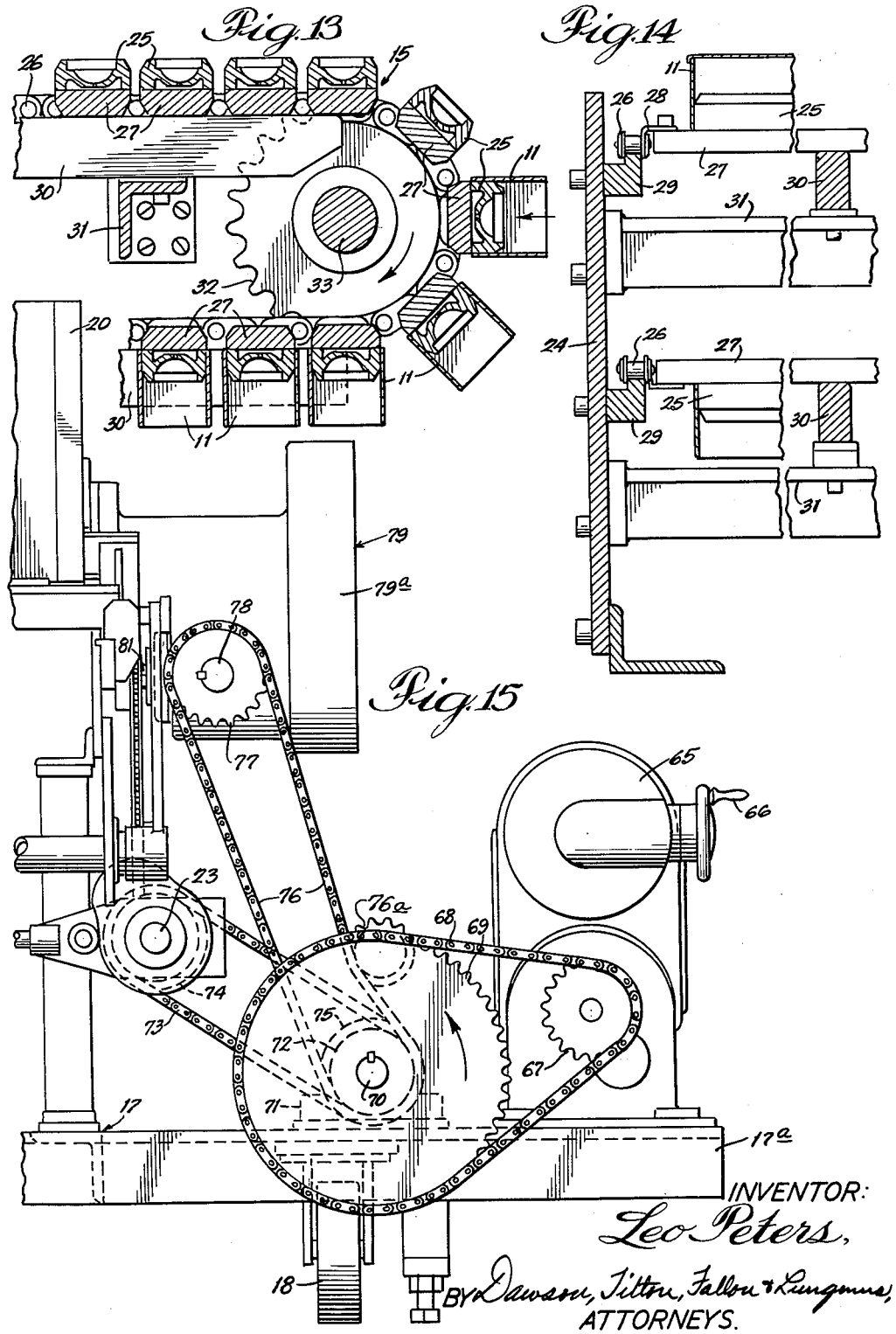

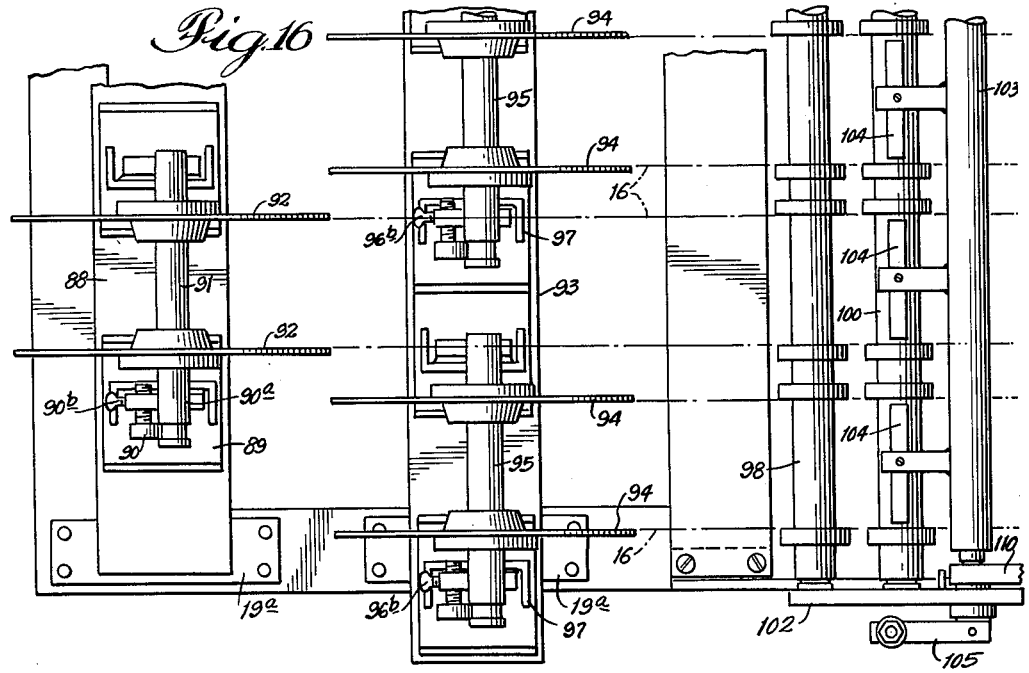

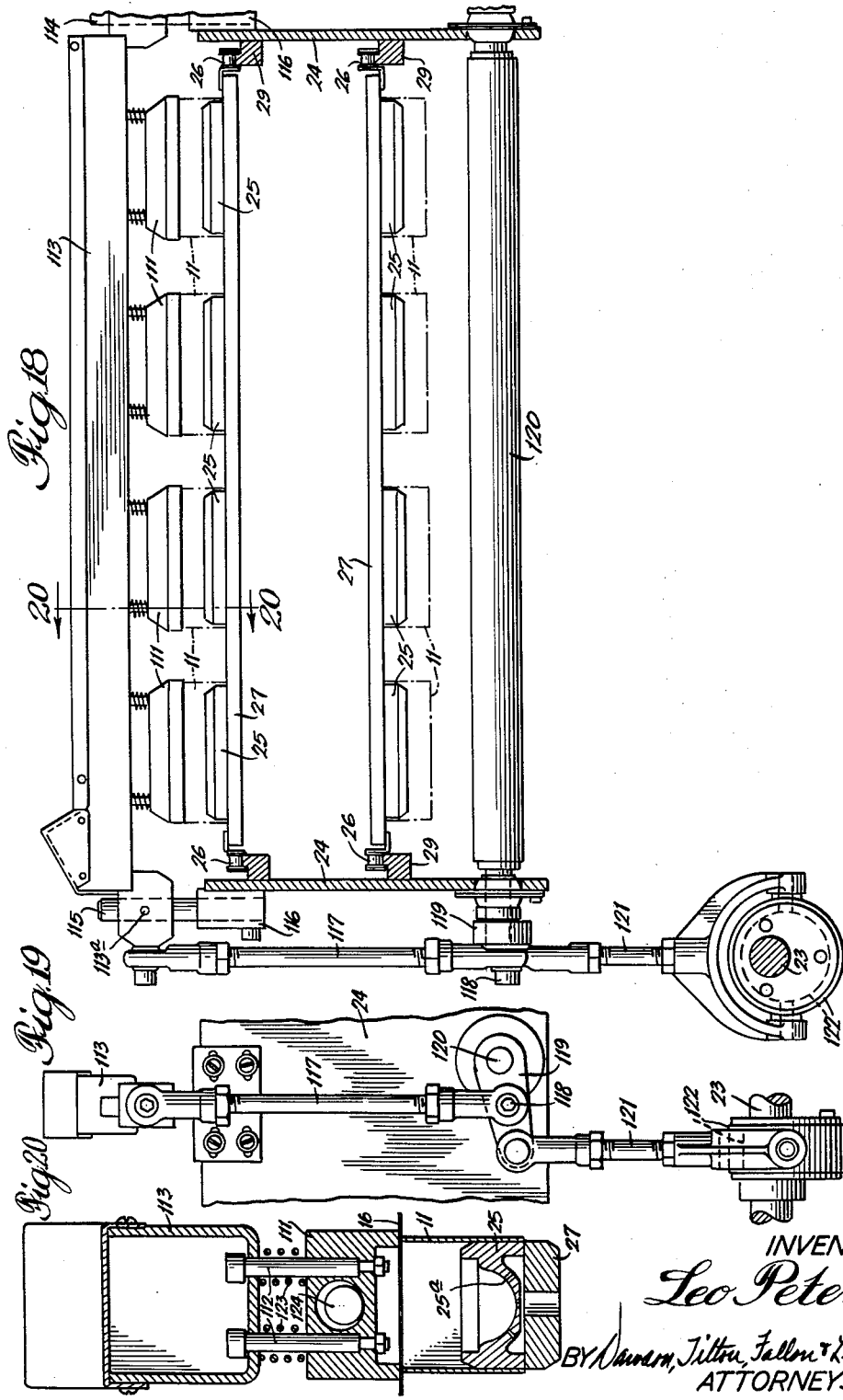

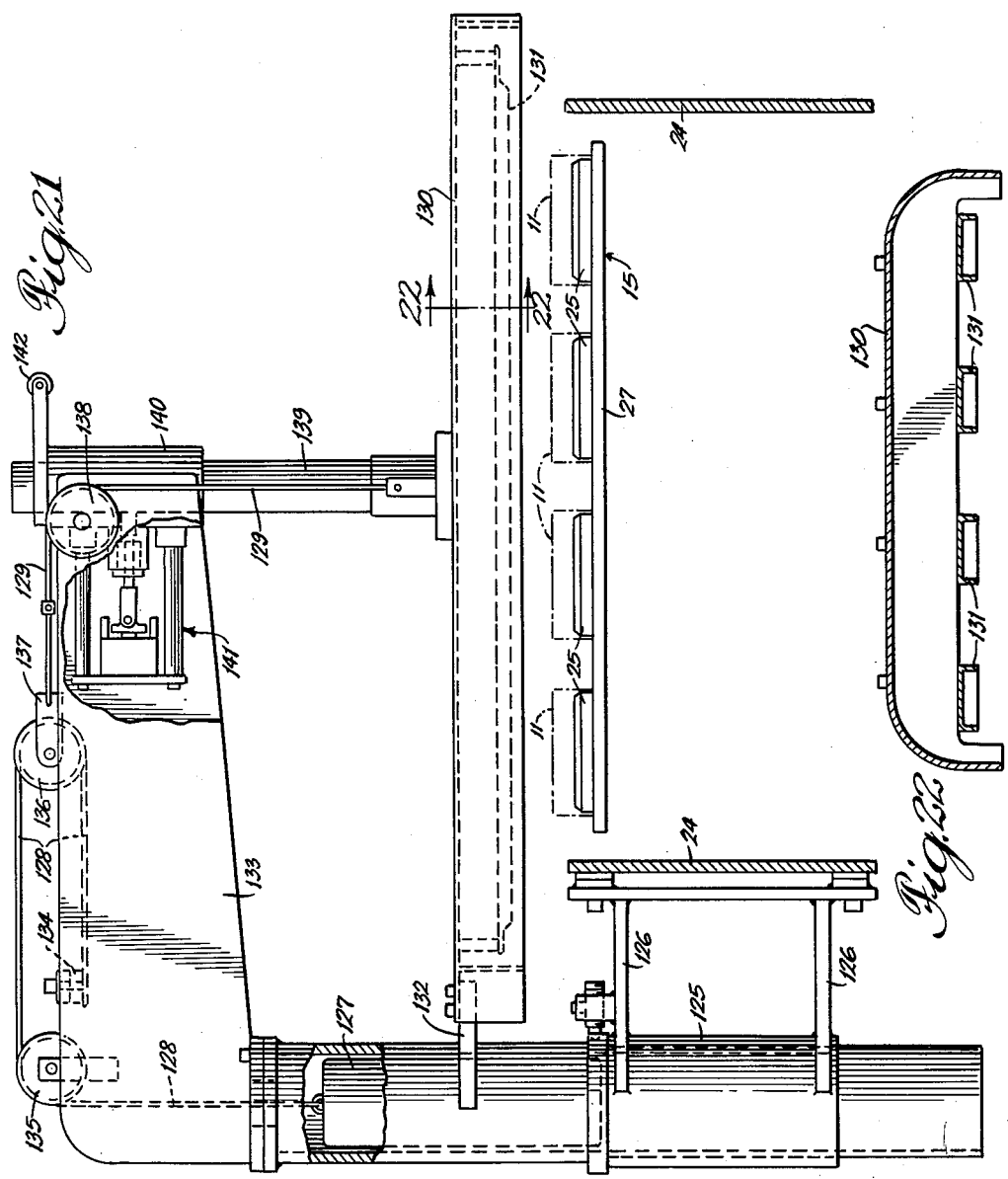

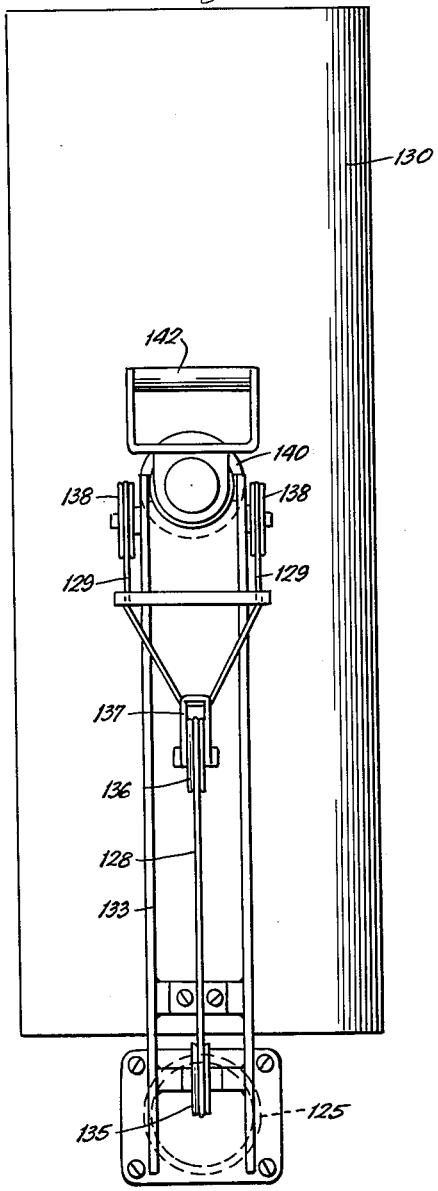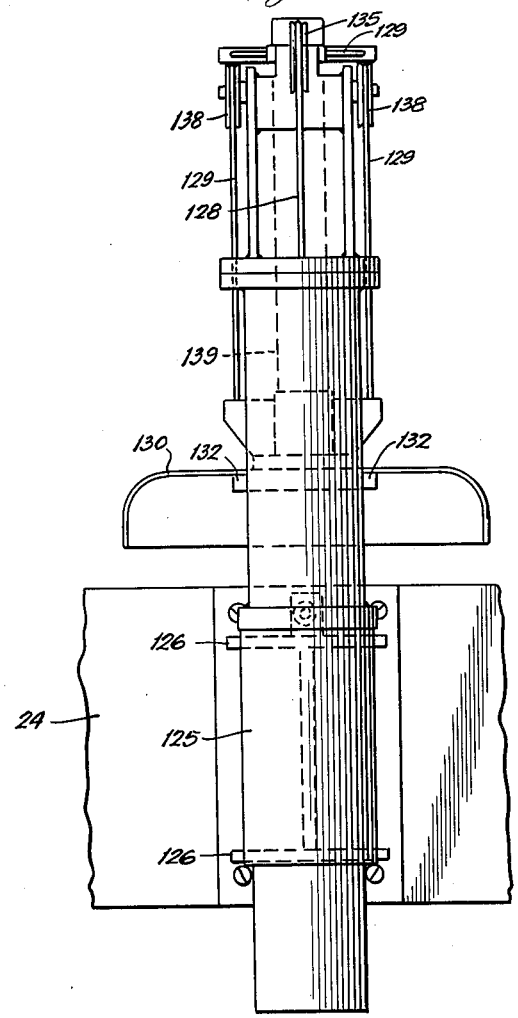

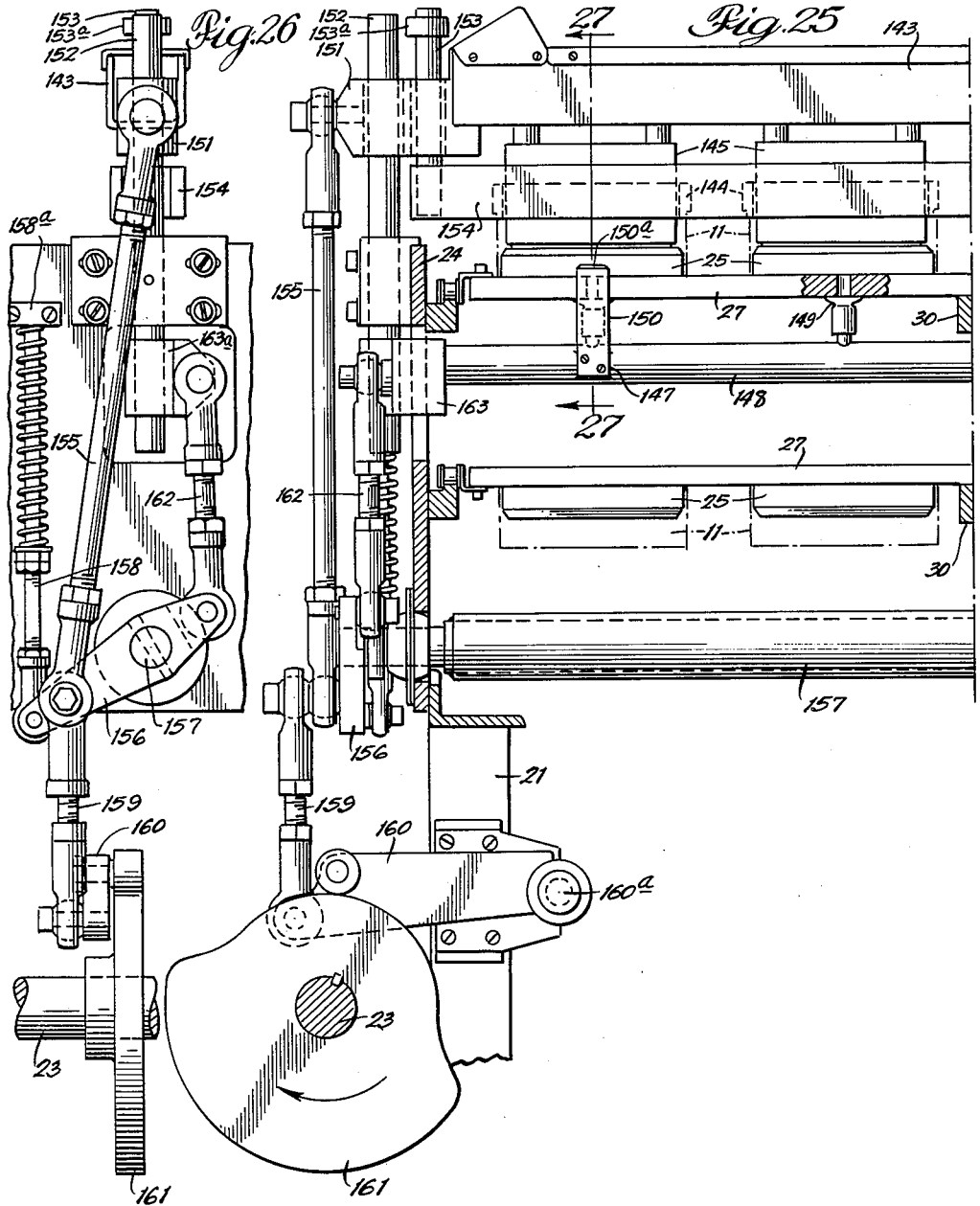

May 8, 1962

L. PETERS 3,033,737

APPARATUS FOR FORMING CONTAINERS EQUIPPED
WITH A REVERSIBLE POCKET OF
THERMOPLASTIC FILM

Filed June 21, 1957

17 Sheets-Sheet 13

INVENTOR:
Leo Peters,
BY Dawson, Tilton, Fallon + Lungmus,
ATTORNEYS.

May 8, 1962
L. PETERS
3,033,737
APPARATUS FOR FORMING CONTAINERS EQUIPPED
WITH A REVERSIBLE POCKET OF
THERMOPLASTIC FILM
Filed June 21, 1957
17 Sheets-Sheet 14
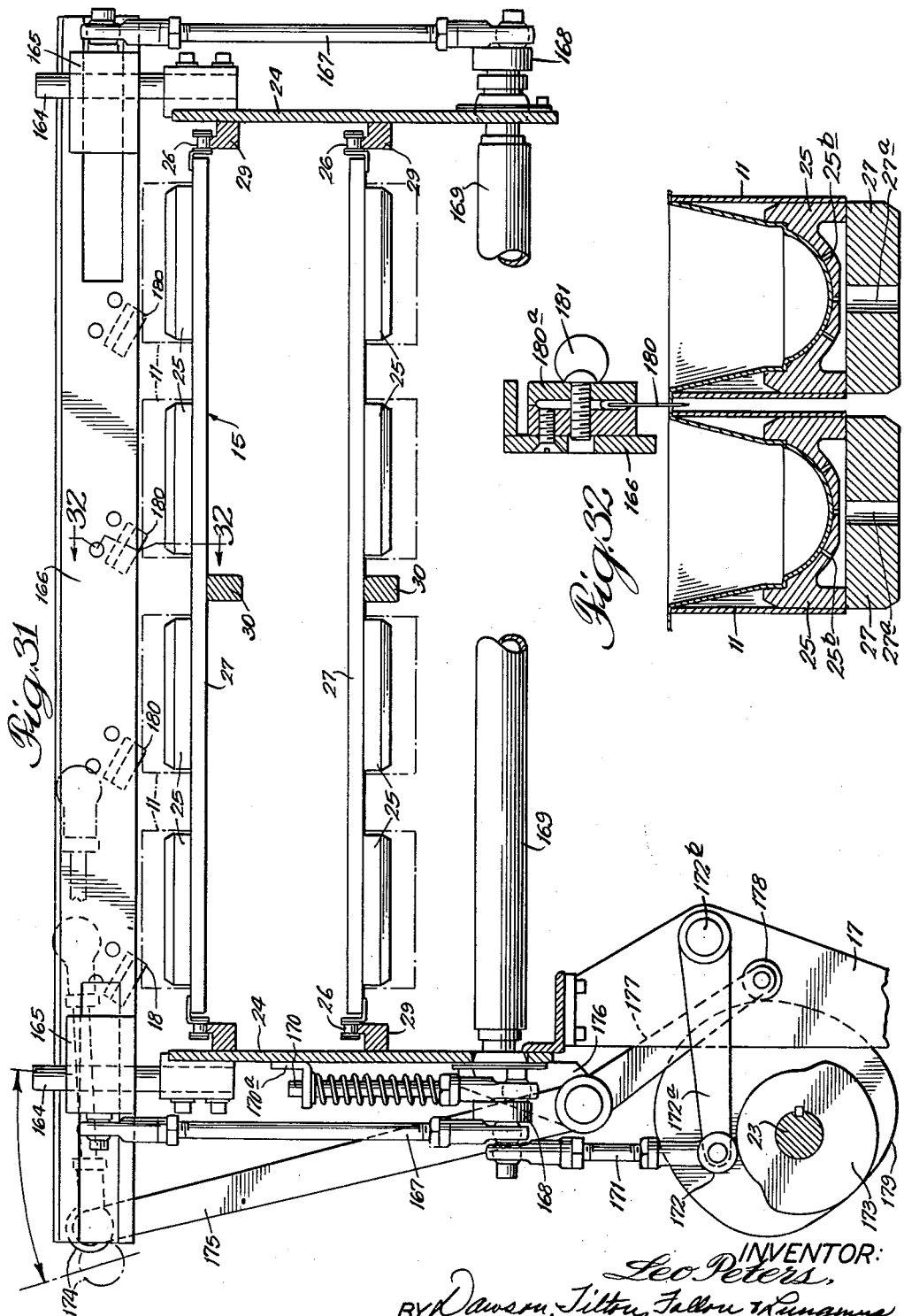
INVENTOR:
Leo Peters,
BY Dawson, Tilton, Fallon & Lungmus,
ATTORNEYS.

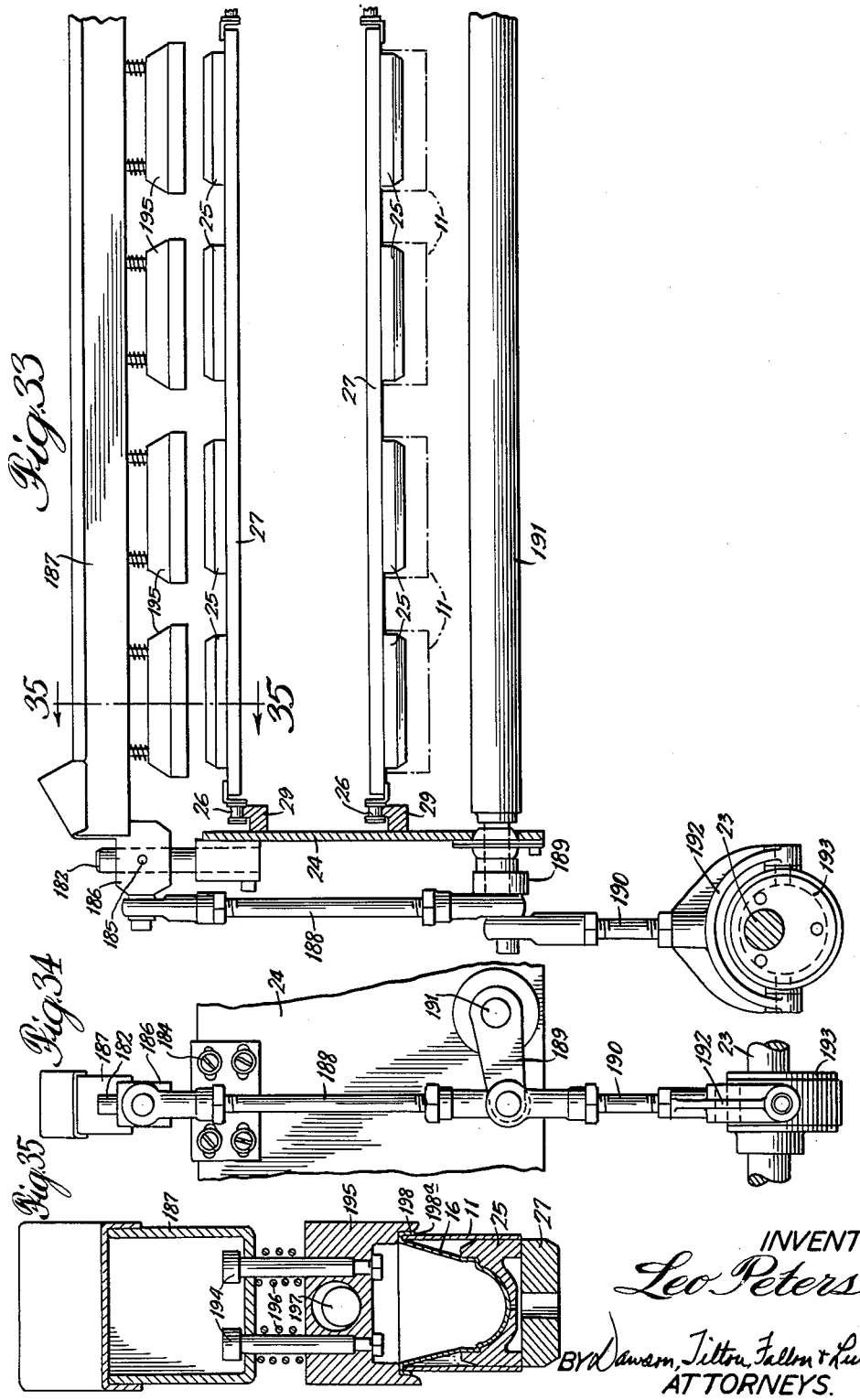

May 8, 1962

L. PETERS 3,033,737

APPARATUS FOR FORMING CONTAINERS EQUIPPED
WITH A REVERSIBLE POCKET OF
THERMOPLASTIC FILM

Filed June 21, 1957

17 Sheets-Sheet 16

INVENTOR:
Leo Peters,
BY Dawson, Tilton, Fallon & Lungmus,
ATTORNEYS.

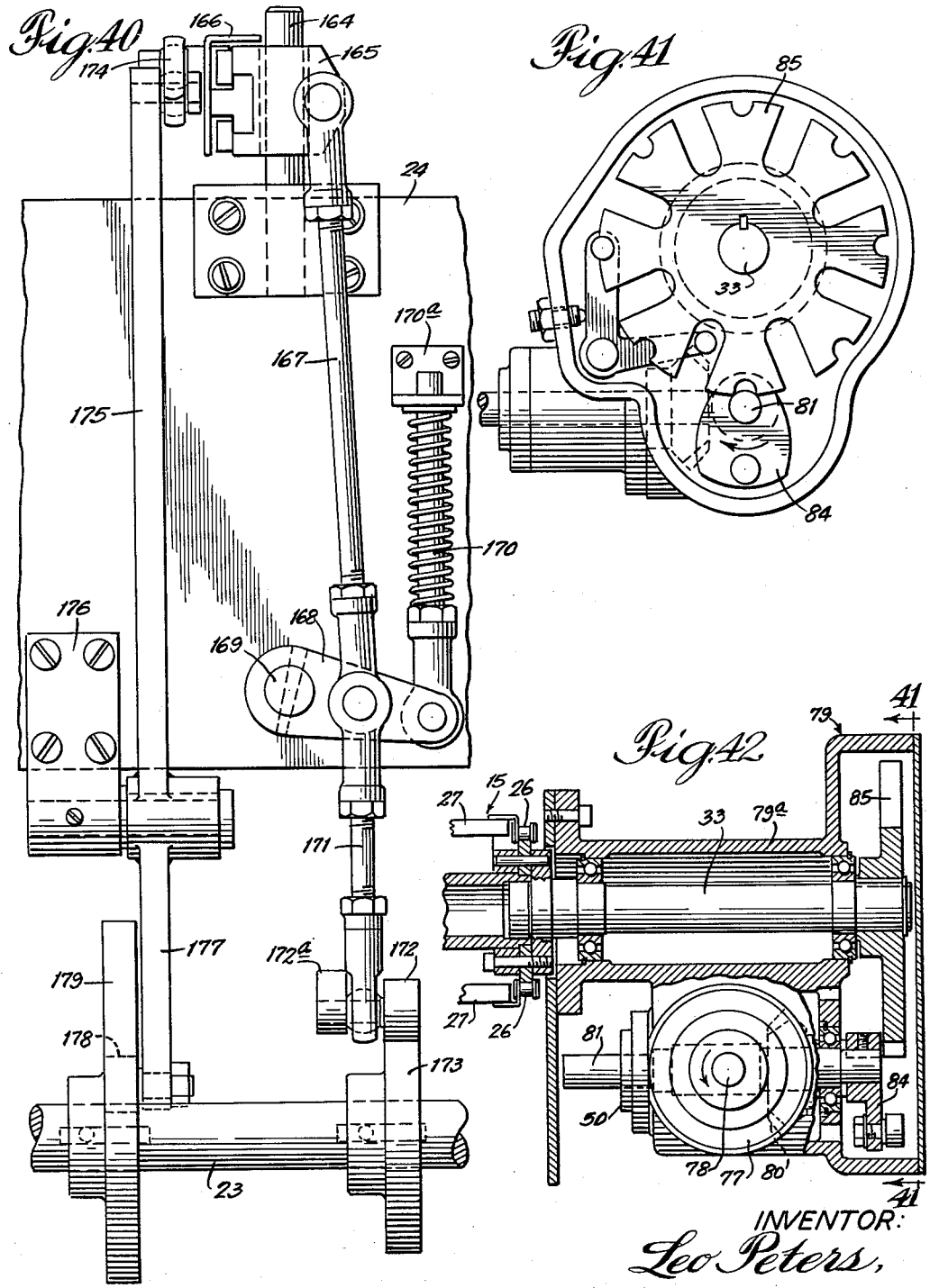

United States Patent Office 3,033,737
Patented May 8, 1962

3,033,737
APPARATUS FOR FORMING CONTAINERS EQUIPPED WITH A REVERSIBLE POCKET OF THERMOPLASTIC FILM
Leo Peters, Grand Rapids, Mich.
Filed June 21, 1957, Ser. No. 667,230
11 Claims. (Cl. 156—486)

This invention relates to a container-forming machine and method, and more particularly to a machine and method for forming containers equipped with a reversible pocket constructed of a thermoplastic film.

Containers of the type produced in accordance with this invention can be seen in my Patent No. 2,631,939, issued March 17, 1953.

It is a general object of this invention to provide a machine and method for producing a container having a reversible pocket suspended therein. Another object is to provide a machine and method for producing an open-sided rectangular container having a reversible pocket suspended therein from the edges of one of the open sides. Still another object is to provide a machine and method for continuously producing a relatively rigid rectangular support having a reversible pocket suspended therein, the pocket being formed from a continuous web of thin, flexible film. Yet another object is to provide a machine and method for producing a relatively rigid rectangular collar having a reversible pocket suspended therein, the pocket having a nonsmooth surface ornamentation. A further object is to provide a machine and method for automatically die forming a thin thermoplastic film into a surface-decorated receptacle within and suspended from an open-ended supporting collar. A still further object is to provide a machine and method for producing a container-wall-providing collar equipped with a reversible thermoplastic surface-indented pocket in which the pocket is automatically formed and set from a heated, substantially planar film sealed to the collar.

Another object is to provide a machine for uniting knocked-down, relatively rigid collars and a continuous web of thermoplastic film to provide containers having a reversible pocket suspended therein. Another object is to provide a machine for producing containers in which a continuous belt is equipped with a series of female perforated dies, the dies being adapted to hold relatively rigid collars in contact with a continuous thermoplastic film. Still another object is to provide a machine of the character described in the object immediately above, in which the dies are adapted to be maintained at a temperature lower than the heat-drawing temperature range of the plastic film so that the film will set after contact with the dies.

A further object is to provide a machine for producing a relatively rigid support equipped with a reversible thermoplastic pocket suspended therein from knocked-down paper collars and a continuous thermoplastic web in which means are provided for mechanically opening the collars and mounting the same on female dies. Another object is to provide a machine of the character specified in the object immediately above, in which means are provided for applying adhesive to the exposed perimetric edges of the collars and for bringing a continuous web of thermoplastic film into engagement with the adhesive-equipped edges. Another object is to provide a machine of the character set forth in the object immediately preceding, in which means are provided for heating the thermoplastic film to its drawing temperature and for vacuum drawing the heated film to form a pocket suspended within the collars. Another object is to provide a machine of the character specified in the immediately preceding object in which means are provided for separating the continuous film between successive collars, for engaging the undrawn portions of the film with the outside of the collars, and for removing the containers from the machine.

Another object is to provide means for receiving knocked-down paper collars and thermoplastic film in continuous roll form and then uniting the collars and film to form containers equipped with reversible pockets, the means performing the following operations: opening up the collars into a right-angled rectangular shape, placing the opened collars in friction-tight relationship on dies whose shape conforms to the cross-sectional shape of the opened collars, applying adhesive to the exposed edges of the collars, placing plastic film over the edges of the collars, heat-sealing the film to the edges, heating the film to its drawing temperature, pressing and vacuum drawing the heated film into the dies so as to "set" the film in permanent shape conforming to the inside shape of the dies, severing the continuous film between collars, folding the undrawn portion of the film down the outside portions of the collars, and ejecting the collars complete with their suspended, formed plastic receptacles from the dies.

Another object is to provide a machine for producing containers for soft plastic foods in which a rectangular-shaped collar is equipped with a reversible, plastic pocket, the machine receiving stacks of knocked-down paper collars with scored corners, automatically ejecting the collars from a magazine containing stacks thereof, opening the collars by "breaking" the unbroken scored collars to a degree that relieves spring-back tension so that on spring-back the open collars will remain without support in substantially rectangular shape, and projecting and positioning the collars on dies in friction-tight relationship. Another object is, in the machine specified in the object immediately preceding, to automatically and continuously convey the die-positioned collars to several stations for the application of adhesive, engagement with plastic film, heating the film to drawing temperatures, drawing the heated film into the dies, trimming and folding down the outside edges of the drawn film, and ejecting the finished container thus provided from the machine.

Another object is to provide a machine for uniting relatively rigid collars with a continuous web of thermoplastic material to form a container equipped with a reversible pocket suspended therein, the machine providing means for automatically placing an adhesive on and around a perimetric edge of the collars. Another object is to provide a machine of the character specified in the object immediately preceding, in which a thin plastic film is automatically and continuously placed on the adhesive-covered edge of the collars in an unwrinkled position and in precise spaced relationship to the size of the collars. Another object is to provide a machine of the character described in the object immediately preceding, in which means are provided for automatically heat-sealing the film to the adhesive-coated perimetric edge of the collars. Another object is to provide a machine of the character described in the object immediately preceding, in which means are provided for continuously and automatically heating the film attached to the collars to the drawing temperature of the film. Another object is to provide in a machine of the character specified in the object immediately preceding means for drawing the heated film into the collars and into contact with dies supporting the collars through the following sequence of operations: (1) contacting and maintaining pressure against the sides of the collar to effectuate an air seal between the sides and the collar-supporting die; (2) contacting and maintaining pressure with die means against the film-attached perimetric edge of the collar; (3) pressing heated plunger means into the heated film to stretch the film down into the collar and female die, whereby an even distribution and thickness of the stretched film is achieved; (4) drawing a vacuum through the female die to complete the distribution of the heated film within the entire inner surface of the die and simultaneously cooling the film. Another object is to provide a machine of the character specified in the object immediately preceding, in which means are provided to cut the continuous web of film between collars whereby separate film-attached collars are provided. Another object is to provide a machine of the character specified in the object immediately preceding, in which means are provided for folding down the overlapping film that protrudes outward from the perimetric edges of the collars. Another object is to provide a machine of the character specified in the object immediately preceding, in which means are provided to force air into the dies to break contact between the inside of the dies and the drawn film and thereafter eject the collars with their attached and drawn film from the positions over the dies in a manner that does not distort the die-impressed surfaces of the film. Other objects and advantages of this invention will be seen as this specification proceeds.

Figure 28:
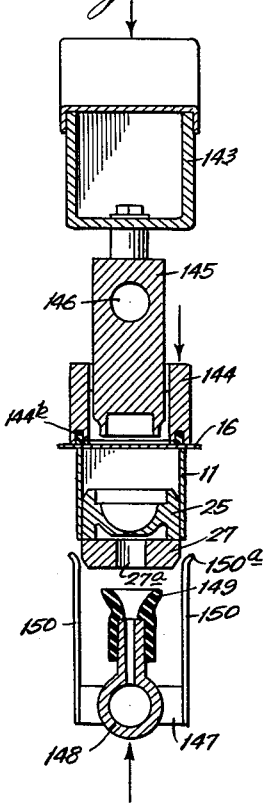
Figure 29:
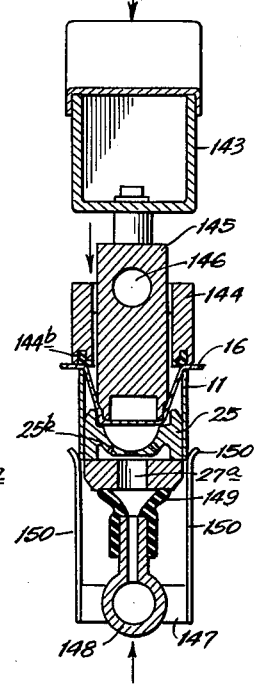
Figure 30:
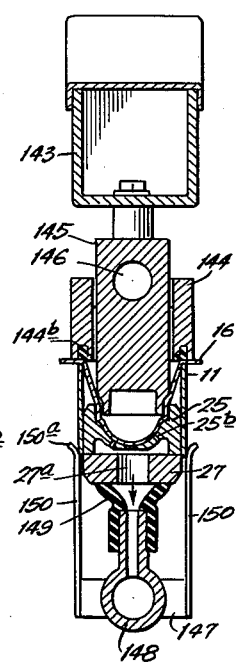
Figure 37:
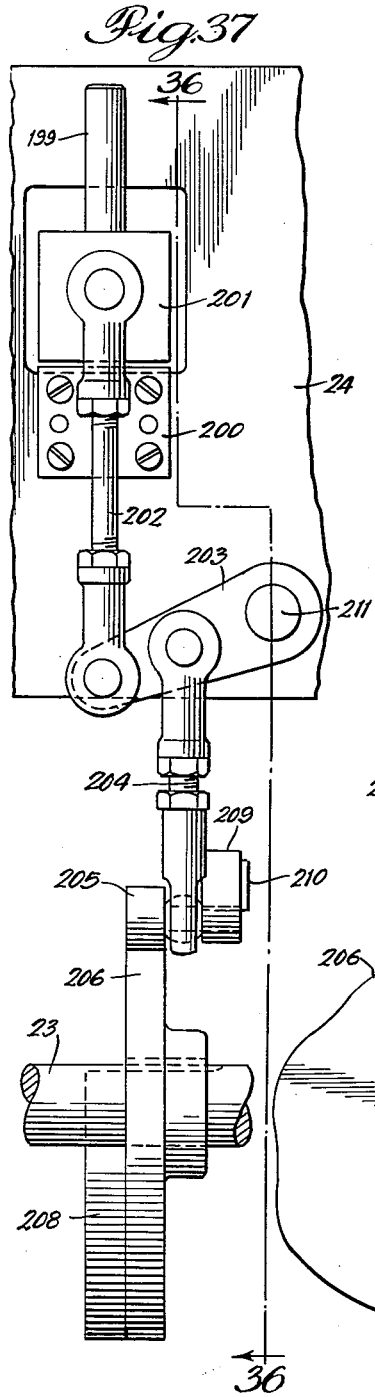
Figure 36:
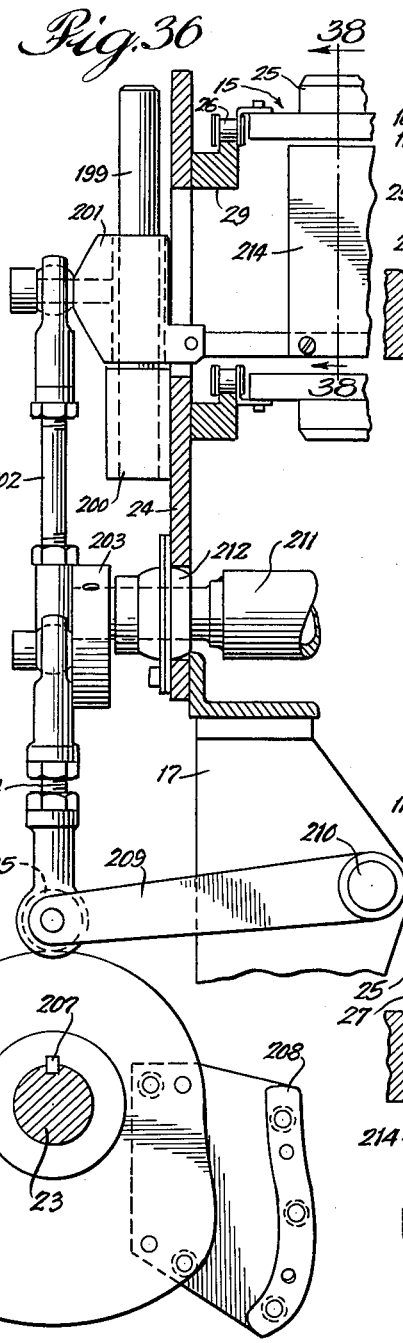
Figure 38:
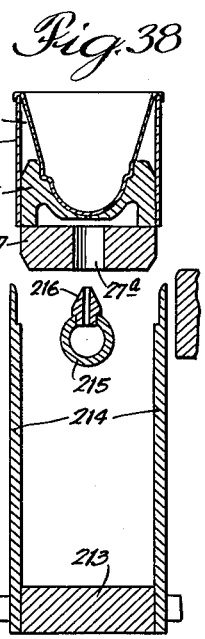
Figure 39:
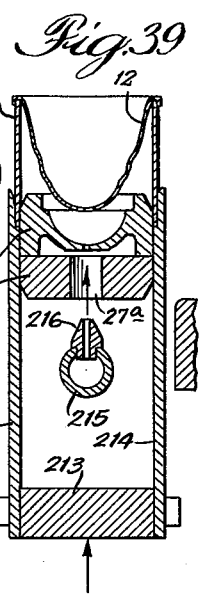

This invention will be described, in an illustrative embodiment, in conjunction with the accompanying drawing, in which:

FIG. 1 is an elevational view of a machine constructed in accordance with teachings of this invention, the function of various elements being noted thereon; FIG. 2 is a perspective schematic view of a portion of the machine depicted in FIG. 1 and which shows various stages of the development of a container; FIG. 3 comprises three perspective views of a container in the various stages of development as are performed on the machine shown in FIG. 1;

FIGS. 4–15 relate more specifically to the "Collar-Mounting" station of the machine shown in FIG. 1, FIG. 4 being a fragmentary, enlarged end elevational view of the collar-mounting end of the machine; FIG. 5 is a fragmentary plan view of the collar-mounting end of the machine; FIG. 6 is an enlarged fragmentary longitudinal sectional view of the machine shown in FIG. 1; FIG. 7 comprehends three perspective views of the sequence of mounting a collar on the machine; FIG. 8 is a fragmentary cross-sectional view of the loading mechanism for mounting the collars on the machine; FIGS. 9–11 are views similar to FIG. 8 showing different operative positions of the loading-mechanism elements which produce the sequence shown in FIG. 7; FIG. 12 is a fragmentary side elevational view of the collar-loading end of the machine; FIG. 13 is a cross-sectional view taken along the line 13—13 of FIG. 5 and showing details of the conveyor of the collar-loading end of the machine; FIG. 14 is a cross-sectional view taken along the line 14—14 of FIG. 5 and showing conveyor crossbar and mounting die details; and FIG. 15 is an elevational view of the drive portion of the machine which is associated with the collar-mounting end of the machine;

FIGS. 16 and 17 relate more specifically to the "Film Supply" end of the machine, FIG. 16 being a fragmentary top plan view of the film-supplying end of the machine, and FIG. 17 being a fragmentary end elevational view thereof;

FIGS. 18–20 relate more specifically to the station designated "Edge Seal" in FIG. 1, FIG. 18 being a transverse sectional view at the edge seal station of the machine; FIG. 19 is a fragmentary side view of the edge seal station of FIG. 18; and FIG. 20 is an enlarged cross-sectional view taken along the line 20—20 of FIG. 18;

FIGS. 21–24 relate more specifically to the station designated "Heat" in FIG. 1, FIG. 21 being a transverse sectional view of the machine at the heating station; FIG. 22 is an enlarged cross-sectional view taken along the line 22—22 of FIG. 21; FIG. 23 is a top plan view of the heating station shown in FIG. 21; and FIG. 24 is a fragmentary end view of the heating station shown in FIG. 21;

FIGS. 25–30 relate more specifically to the station indicated "Draw" in FIG. 1, FIG. 25 being a fragmentary transverse sectional view of the machine taken at the draw station; FIG. 26 is a side view of the draw station of the machine shown in FIG. 25; FIG. 27 is an enlarged cross-sectional view taken along the line 27—27 of FIG. 25; and FIGS. 28–30 are views similar to FIG. 27 but showing the drawing elements in different operative positions during the draw operation;

FIGS. 31, 32, and 40 relate more specifically to the station designated "Film Severing" in FIG. 1, FIG. 31 being a transverse sectional view of the machine taken through the film-severing station; FIG. 32 is an enlarged cross-sectional view taken along the line 32—32 of FIG. 31; and FIG. 40 is an enlarged end view of the film-severing apparatus shown in FIG. 31;

FIGS. 33–35 relate more specifically to the apparatus designated as the "Fold-down Station" in FIG. 1, FIG. 33 being a fragmentary transverse section taken through this station of the machine; FIG. 34 is a fragmentary side view of the apparatus shown in FIG. 33; and FIG. 35 is a cross-sectional view taken along the line 35—35 of FIG. 33;

FIGS. 36–39 relate more specifically to the apparatus and station designated "Eject" in FIG. 1, FIG. 36 being a fragmentary transverse section through the eject portion of the machine; FIG. 37 is a fragmentary side view of the apparatus shown in FIG. 36, the view shown in FIG. 36 having been taken along the line 36—36 of FIG. 37; FIG. 38 is an enlarged cross-sectional view taken along the line 38—38 of FIG. 36; and FIG. 39 is a view similar to FIG. 38 but showing the elements thereof in a different operative position;

FIGS. 41 and 42 relate more specifically to the drive portion of the machine, FIG. 42 being a cross-sectional view showing particularly the Geneva drive element for intermittently operating the conveyor portion of the machine; and FIG. 41 is a cross-sectional view taken along the line 41—41 of FIG. 42.

As pointed out above, the machine shown in the drawings is suited for manufacture of containers for soft plastic foods, such containers being set forth in detail in my Patent No. 2,631,939. Reference is hereby made to that patent, particularly for the mode of operation of the containers when employed as packages for soft plastic foods. One of the problems encountered in the packaging of soft plastic foods such as butter, margarine, ice cream, cheese, etc., and which was solved by the invention disclosed in the above-identified patent, was the inability to provide such foods having surface ornamentation. When packages of soft plastic foods were provided having the desired surface decoration, the decoration was usually at least partially destroyed during removal of the product. The invention in the above-identified patent permitted the delivery in a commercially practical manner to the serving dish of the consumer, intact and unmarred, of a decoratively-shaped, surface-ornamented, consumer size unit of a soft plastic food. This was provided through the use of a container such as is designated generally by the numeral 10 in FIG. 3.

Container 10 includes a relatively rigid support or collar 11 equipped with a reversible pocket 12, the pocket being constructed of a thin, flexible film and extending inwardly of support 11. Surface decoration 13 is provided in pocket 12, which decoration is imparted to the soft plastic material supported within pocket 12. To achieve the surface decoration of the soft plastic food material, the food material is introduced into the pocket which serves as a mold, preferably in fluid or semi-fluid condition. Under such circumstances, the food material rapidly conforms to the shape and surface ornamentation of the pocket. Thereafter, the food material is firmed within the pocket by cooling the food material while it conforms to the shape and surface ornamentation of the walls of the pocket and clings thereto. For facilitating shipment, a cover will usually be secured across the open top of the filled pocket. When the soft plastic food is desired to be removed from container 10, the cover is first removed and the container 10 placed over a saucer or dish with the open mouth of pocket 12 disposed downwardly. Thereafter, collar 11 is raised while progressively reversing the flexible film making up pocket 12, thus leaving the surface ornamentation of the plastic food unmarred.

Also shown in FIG. 3 are the preliminary stages of development or manufacture of container 10. The extreme left-hand portion of FIG. 3 shows a perspective view of a rectangular collar 11 in a condition adapted to be equipped with a pocket 12. Providing pocket 12 is a substantially planar web of thermoplastic film 14 seen in the middle portion of FIG. 3. In the illustration given, the construction of the container generally designated 10a does not occur per se, since the planar film 14 is first deformed to the pocket structure designated by numeral 12 in FIG. 3 prior to severing of the film along the longer edges designated 14a. This can be quickly appreciated from a consideration of FIG. 2, which is a fragmentary perspective schematic view of the manufacture of container 10.

Referring now to FIG. 2, and particularly the extreme top portion thereof, it is to be seen that the film-severing operation follows the drawing operation, so that, in the illustration given, the structure shown in the center of FIG. 3 would not be provided. In FIG. 2, the lower right-hand portion shows a rectangular collar 11 being mounted on a conveyor generally designated 15. Prior to mounting of collar 11 on conveyor 15, collar 11 is provided in a collapsed or folded condition designated 11a. The mechanism for providing the mounting of collar 11 on conveyor 15 is indicated generally at the extreme right-hand portion of the view of the machine seen in FIG. 1. After mounting of collar 11 on conveyor 15, the collar passes successively through an adhesive station, a film-engagement station, an edge-sealing station, a heating station, a drawing station, a film-severing station, a film fold-down station, and an ejecting station, all of which are identified in FIGS. 1 and 2.

Thus it is to be seen that the machine outlined above converts a folded collar 11a and a web of film designated 16 into a container 10 especially suited for packaging soft plastic foods.

Referring now to FIG. 1, the numeral 17 designates generally a frame for the machine. For convenience of relocating the machine, frame 17 is equipped with casters 18 disposed at the four corners of frame 17. It is to be appreciated that the machine shown in FIG. 1 is a complete unit carrying rolls of film 19 and magazines 20 for stacked, folded collars 11a, so that the machine need not be restricted to any particular location because of the need for raw materials.

Frame 17 not only provides a mounting for the container-forming portion of the machine, but also means for mounting the necessary control and auxiliary apparatus such as valves, air lines, switches, panel boards, etc., none of which are shown, since they are not considered necessary for the understanding of this invention.

Frame 17 is provided with a plurality of pedestals or columns 21 which support endless conveyor 15 and the operative elements associated with the various stations in the machine. Pedestals 21 are equipped with bearings 22 in which line shaft 23 is journaled. Line shaft 23 is employed to actuate through suitable cam arrangements, the various operative mechanisms associated with the various stations identified in FIG. 1. Frame 17 also carries pedestals 19a, which support rolls of film 19.

Mounted on pedestals 21 is a housing 24. Housing 24 is equipped with two full length sides and a full length bottom, the top portion being substantially open to permit access to the various operating mechanisms associated with the different stations. In this connection, it is to be noted that, in the illustration given, all of the operations for uniting collar 11 with film 16 are performed on the top run of conveyor 15 with the exception of adhesive application and collar mounting. This sequence of operations can also be readily seen from a consideration of FIG. 6, which can be considered a longitudinal sectional view through conveyor 15. In FIG. 6, conveyor 15 is seen to include a plurality of dies 25 which also serve as holders for collars 11.

Conveyor 15 includes a roller chain 26, as can be seen in FIGS. 5, 13 and 14. Two continuous lengths of roller chain 26 are provided, one for each side of the machine, which are interconnected by crossbars 27, as can be seen in FIGS. 5 and 14. Crossbars 27 provide the support for dies 25, crossbars 27 being secured to roller chain 26 by means of angle clips 28. Roller chain 26 is supported upon a longitudinally-extending guide rail 29, four of which are provided, two for each side of the machine. Guide rails 29 can be conveniently secured to the side of housing 24, as seen in FIG. 14. To additionally support conveyor 15, I provide a longitudinally-extending support member 30 disposed midway between opposite guide rails 29. Support members 30 prevent undue deflection of conveyor 15 which might be occasioned by the substantial weight therein attributable to the large number of dies 25 associated therewith. Longitudinally-extending members 30, as seen in FIGS. 13 and 14, are in turn supported from housing 24 by means of transverse angles 31. Angles 31 can also be seen in dotted outline on FIG. 1.

The roller chain portion 26 of conveyor 15 is suitably powered by drive sprockets 32, which can be readily seen in FIGS. 1, 6 and 13. Drive sprockets 32 are attached to shaft 33, which in turn is powered through a Geneva arrangement to be described hereinafter. In the illustration given, drive sprockets 32 are associated with the collar-mounting end of conveyor 15, while the other end of conveyor 15, as seen in FIGS. 1 and 6, turns around a pair of take-up or idler sprockets 34. Idler sprockets 34 are fixed to shaft 35 and associated with a take-up mechanism 36 (as indicated on FIG. 1). It is believed that the details of construction of the take-up mechanism and sprocket arrangement is unnecessary, for those skilled in the art will perceive suitable variations for achieving this purpose.

It is important to note that conveyor 15, as best seen in FIG. 13, includes crossbars 27 and dies 25 that are provided with the same dimensions in the direction of conveyor travel. In other words, the sides of dies 25 and crossbars 27 transverse of the conveyor are flush. This arrangement permits the ready achievement of an ejection action by means of members progressing upwardly along the sides of crossbar 27 and die 25, as is represented schematically at the ejection station shown in FIG. 6. The top surface of crossbar 27 between adjacent dies on each crossbar 27 provides, however, a convenient restriction or abutment for precisely positioning collars 11 on dies 25, as can be readily appreciated from a consideration of FIG. 14 and the extreme right-hand portion of FIG. 13. The operation of positioning collars 11 on dies 25 will now be described in greater detail, reference being had primarily to FIGS. 4–12.

*Collar-Mounting Operation*

Collars 11 are provided in the first instance in a collapsed, scored condition, as indicated by the structure designated 11a in FIG. 2. As pointed out previously, a plurality of such folded collars 11a can be conveniently stacked in magazines 20, four of which are shown in FIG. 4. When this arrangement is followed, each crossbar 27 will carry four dies 25. The sequence of removing collapsed collars 11a from magazines 20 is shown schematically in FIG. 7, where a three-step sequence is illustrated. First, a knife member 37 is inserted between a partially open collar 11b, as seen in the extreme right-hand portion of FIG. 7. The partial opening of folded collar 11a to the structure designated 11b can be conveniently achieved through suction as applied to the bottom surface of folded collar 11a through suction cup 38, as seen in FIG. 8. Subsequent forward movement, i.e., toward conveyor 15, of knife member 37 brings partially opened collar 11b under pusher bar 41 and into alignment with rocker arm 39 and finger 40, which completes the opening of collar 11b into the rectangular form designated 11 in the central portion of FIG. 7. Thereafter, a pusher bar 41 moves forwardly, as seen in FIG. 11, to position collar 11 about die 25, as seen in the extreme left-hand portion of FIG. 7. Also seen in that portion of FIG. 7 is the female die surface configuration 25a which is provided in die 25.

For the purpose of removing the partially opened collar 11b from magazine 20 and moving it forwardly under pusher bar 41 into alignment with rocker arm 39 and finger 40, knife member 37 is reciprocably mounted on subframe 42, which in turn is secured to housing 24. In FIG. 12, knife member 37 and its transverse frame member 37a are slidably mounted on a guide 37b on subframe 42. Reciprocation of frame 37a on guide 37b is achieved through a pivotal connection with linkage 44, linkage 44 being pivotally mounted on subframe 42 as at 43. Linkage 44 also includes an integral stub arm extension and cam follower 45 which follows the contour of cam 46 to provide the above-mentioned reciprocating motion of knife member 37. Cam 46 is mounted on shaft 47, which in turn is carried by subframe 42. Shaft 47 is powered through a sprocket 48 through a chain drive 49 from a sprocket 50 deriving power from a source associated with frame 17 and housing 24.

Knife member 37 is provided with an inwardly-extending recess 51, placed in the leading tapered edge of knife member 37, which permits engagement of knife member 37 with a portion of a partially-opened collar 11a, as seen in FIGS. 9 and 10. Positive following of cam 46 by cam follower 45 is provided by spring 52 which is connected between linkage 44 and housing 24.

The forward movement of knife members 37 and their frames 37a provides for the downward withdrawal of suction cup 38, as can be appreciated from the schematic representation shown in FIG. 9. As seen in FIG. 5, in which frame 37a is advanced to a position closest to conveyor 15, a roller 53 mounted on frame 37a abuts arm 54, thereby pivoting arm 54 about its pivotal mounting 55 so as to retract the suction cup assembly 38 mounted on cross-arm 54a remote from the pivotal mounting 55. Rearward motion of frame 37a on guide 37b brings roller 53 into engagement with offset 56 in arm 54, thereby permitting cross-arm 54a and suction cup assembly 38 to rise into engagement with another collar 11a in magazine 20.

Once knife member 37 has advanced a partially-opened collar 11a to the position shown in FIG. 9, the rocker arm mechanism 39 shown in the central portion of FIG. 7 is actuated to fully open the collar into a rectangular shape. Four rocker arms 39 with fingers 40 are provided, one for each of the partially-opened collars 11a which have previously been removed from magazines 20 by knife members 37. As can be seen from FIG. 4, each rocker arm 39 is pivotally mounted on a transverse shaft 57. Each rocker arm 39 is also pivotally mounted to a transverse frame member 58 as at 58a. Thus, reciprocatory movement of shaft 57 causes angular movement of rocker arms 39. Reciprocatory movement of shaft 57 is provided through linkage 59, including elements 59a and 59b, linkage element 59b being provided with cam follower 59c which bears against cam 60. Positive following of cam follower 59c on the contour of cam 60 is provided by spring 59d shown in fragmentary form in the lower left-hand portion of FIG. 4, and which is secured to the stationary portion of the frame supporting the machine. Linkage elements 59a and 59b are so proportioned that rocker arms 39 pivot past a vertical position so as to "over-fold" collars 11a. The stress thereby applied to the scoring lines in carton 11 thus deprives the collar of any tendency to return to a collapsed condition, and further, is so adjusted as to cause the collars to return to a rectangular shape.

To complete the mounting of collar 11 upon die 25, pusher bar 41 is moved from the position shown in FIG. 10 to that shown in FIG. 11, rocker arm 39 being pivoted out of the path of movement of pusher bar 41 and knife member 37 being retracted, as seen in FIG. 11, to be in position to provide a subsequent collar 11. Pusher bar 41 is provided in segmented form to cooperate with plow-shaped guides 61 to direct opened collars 11 into position on dies 25. Pusher bar 41 is connected to linkage 62 (best seen in FIG. 12), which in turn is pivotally mounted as at 62a on subframe 42. Linkage 62 is guided at one end on guide 37b and also includes a stub arm and cam follower 62b, which follows the contour of cam 63. Cam 63, like cam 46, is mounted on shaft 47 and the positive following of cam follower 62b on cam 63 is provided by spring 62c connected between linkage 62 and a portion of subframe 42. Linkage 62 is connected to pusher bar 41 through cross-head 64 which is slidably mounted on guide 37b.

After collar 11 has been positioned on die 25 as seen in FIG. 11, conveyor 15 is advanced to bring a successive set of dies into alignment for receiving successive collars from magazines 20. The intermittent operation of conveyor 15 also permits the various subsequent operations of applying adhesive, heat sealing, heating, drawing, cutting, folding down severed films, and ejecting to be performed on a stationary collar 11.

A drive arrangement for this purpose is shown in FIG. 15. In FIG. 15, a portion of frame 17 is designated 17a and is employed to support a variable speed electric motor unit designated 65. Speed variation of unit 65 can be achieved through handle 66. The output of variable speed drive unit 65 is transmitted through sprocket 67, chain 68 to an intermediate sprocket 69 keyed to a shaft 70, which in turn is suitably journaled in bearings 71 on frame portion 17a. A second sprocket 72 is also fixed to shaft 70, which transmits rotative power through chain 73 to a sprocket 74 mounted on the same shaft 23 as is cam 60. Cam 60 is responsible for the reciprocatory movement of shaft 57 which causes the angular movement of rocker arms 39.

A second driven sprocket 75 is mounted on shaft 70 which transmits power through chain 76 to sprocket 77 seen in FIGS. 15 and 42. Tension sprocket 76a (FIG. 15) provides tension in chain 76. Sprocket 77 is keyed to shaft 78, which is suitably journaled in the housing 79a of Geneva drive 79, the Geneva unit housing being mounted on frame 17 and conveyor housing 24. Shaft 78 is provided with a suitable gear that cooperates with pinion 80 (seen only in FIG. 42) to turn shaft 81. Shaft 81 in turn is keyed to sprocket 50, forming the power source previously described which operates through chain 49 and sprocket 48 to rotate cams 46 and 63 and actuate knife member 37 and pusher bar 41. A tension sprocket 83 is mounted on a shaft suitably journaled on subframe 42 and maintains chain 49 in proper tension as at 82. Shaft 81 is also provided with an eccentric 84 which provided intermittent movement of conveyor 15 by cooperation with Geneva unit plate 85, the rotation of plate 85 being transmitted through shaft 33 to which is secured drive sprocket 32 (as seen in FIG. 13).

The intermittent advancement of conveyor 15 achieved through the operation of the Geneva drive unit 79 positions a collar 11 over the adhesive station, as can be appreciated by a consideration of FIGS. 1 and 6. When the conveyor is stopped the linkage associated with the eject station (as seen in FIG. 1) operates to elevate an adhesive applicator 86, the top planar surface of applicator 86 at the top of its travel abutting the perimetric edge of collar 11 as seen in FIG. 6. Upon further actuation of the linkage associated with the eject mechanism, applicator 86 is lowered to the position designated 86a and shown in dotted line in FIG. 6, where it is immersed in an adhesive receptacle 87. In this manner a predetermined and exact amount of adhesive can be applied to the outwardly extending perimetric edge of collar 11.

Subsequent travel of conveyor 15 advances a collar 11 around take-up sprocket 34 and into engagement with a web of film 16. The film-supplying station and operation is shown in greater detail on FIGS. 16 and 17.

*Film-Supplying Operation*

Rolls of film 19 are rotatably mounted on pedestals 19a. Two pairs of pedestals 19a are provided, one pair being of less height than the other to permit rolls of film to be vertically offset, as seen in FIG. 1. The outer or leftmost pair of pedestals 19a in FIG. 1 supports a beam 88 (in FIG. 17) which in turn carries four bearing mounts 89. Mounted atop bearing mounts 89 are bearings 90. Journaled in bearings 90 are shafts 91 of spools 92, spools 92 in FIGS. 16 and 17 being shown devoid of film 16. Spaced closer to sprocket 15 and frame 17 than beam 88 is a second beam 93 which corresponds to outwardly spaced beam 88. Spools 94 are rotatably mounted on shafts 95 journaled in bearings 96 which in turn are supported on bearing mounts 97 carried by beam 93 much the same as spools 92 are supported on beam 88. Spools 93 are laterally offset from spools 92 to provide the four webs necessary for engaging four adjacent die-carried collars 11. One bearing 90a of each pair of bearings 90 supporting shafts 91 is provided with a thumb screw 90b to restrain the free rotation of shaft 91 and thereby maintain a web of film 16 drawn from spool 92 in a taut condition. Similar thumb screws 96b are provided on bearings 96a for the same purpose.

As seen in FIGS. 1 and 6, film 16 engages a guide roll 98, passes down and around a tension roll 99, up and around a second guide roll 100, and underneath a pressure roll 101 at which point it contacts the top perimetric edge of a collar 11. Housing 24 has attached thereto a frame structure 102 (seen in FIGS. 1 and 16) in which guide rolls 98 and 100 are journaled. Hollow shaft 103 is also journaled in frame structure 102 and carries press pads 104 which maintain web 16 adjacent guide roll 100. Hollow shaft 103 is provided with a pair of longitudinally directed arms 105 to which are secured upper linkage members 106. One upper linkage member 106 is connected to a lower linkage member 106a which in turn is secured at the other end in an eccentric manner, as at 107, to line shaft 23. Linkage members 106 are also pivotally connected with arms 108 which in turn support tension roll 99. Arms 108 are connected to a torsion tube extending transversely of housing 24, and journaled therein. Fixed to frame structure 102 are a pair of arms 110 which pivotally carry tension roll 101.

Once each revolution of line shaft 23, linkage members 106 reciprocate vertically, thus raising and lowering tension roll 99 and unwinding additional film from rolls 19. At the same time, arms 105 cause hollow shaft 103 to rotate, lifting press pads 104 off of guide roll 100.

After web of film 16 has been contacted to the top perimetric edge of collars 11 under press roll 101, subsequent advancement of conveyor 15 brings die 25 and its associated collar 11 into an edge seal station. This station is designated schematically on FIGS. 1 and 6, and shown in detail in FIGS. 18–20.

*Edge Seal Operation*

To firmly unite film 16 with the top perimetric edge of collar 11, a pressing and heating operation is performed which is designated edge sealing. Herein a shoe 111 is brought into contact with the film 16 overlying the top perimetric edge of collar 11, as can be readily appreciated from a consideration of FIG. 20. Shoes 111 (in the illustration given four such shoes are provided disposed across the width of the machine corresponding to the spacing of dies 25) are slidably mounted on bolts 112 which depend from beam member 113. Beam member 113 is rigidly mounted, as by pins 113a, on shafts 114 and 115 which reciprocate in bearing sleeves 116 secured to housing 24.

Beam member 113 is also secured to linkage 117 which is pivotally connected at its other end, as at 118, to arm 119. One end of arm 119 is attached to torsion tube 120 which is journaled in housing 24 and extends across the width thereof. A similar linkage 117 (not shown) is provided for the right-hand portion of the machine as viewed in FIG. 18. Arm 119 is connected at its end opposite its connection to tube 120 with a second linkage 121, linkage 121 being connected at its other end with a cam follower ring structure disposed about cam 122a which is mounted on line shaft 23. Thus, as line shaft 23 rotates, linkage 121 is reciprocated through the action of cam 122a, in turn causing linkage 117 to be reciprocated which results in raising and lowering beam member 113 and, therefore, shoes 111. Shoes 111 are normally maintained in spaced relation to beam member 113 by coil springs 123 which are mounted about bolts 112 but which can be compressed to permit shoe 111 to apply a yielding pressure to the top perimetric edge of collar 11. Since line shaft 23 completes one revolution for each stepwise advancement of conveyor 15, shoes 111 are brought into contact with each successive set of collars 111 to seal film 16 to collar 11. In FIG. 20 the numeral 124 denotes an electrical heating element employed to heat shoe 111. Not shown are the electrical wiring and connections necessary to provide power for heating element 124.

In operation of the machine, it has been found that press roll 101 and the seals between film 16 and a series of adjacent, longitudinally spaced collars 11 provide a fixing-in-position of film 16 so that reciprocation of tension roll 99 only unwinds rolls of film 19 without disturbing the arrangement and position of collars 11 and the attachment of film 16 thereto.

Subsequent to heat sealing film 16 to collar 11, the film-provided collar is now advanced by conveyor 15 to a heating station, shown schematically in FIGS. 1 and 6 and in more detail in FIGS. 21–24.

*Heating Operation*

Referring now specifically to FIG. 21, the numeral 125 designates a sleeve standard which is secured by connecting members 126 to housing 24. Slidably mounted within sleeve standard 125 is counterweight 127. Counterweight 127 is connected by cables 128 and 129 (also seen in FIGS. 23 and 24) to heater casing 130. Heater casing 130 provides a mounting for a plurality of electrically energized heating elements 131 which extend athwart conveyor 15, as can be seen in FIGS. 21 and 22. Suitable electrical connections (not shown) are provided to conduct electrical power to heating elements 131. Heater casing 130 is provided with a pair of guide arms 132 which engage the sides of sleeve standard 125 and maintain heater casing 130 against lateral movement when heater casing 130 is raised under the influence of counterweight 127.

Sleeve standard 125 is provided with a laterally extending frame portion 133 which is rigidly connected to the top of standard 125. Frame portion 133 provides a mounting for securing the end of cable 128 as at 134 and also provides a mounting for pulley 135 over which cable 128 is entrained. Cable 128 is also entrained over pulley 136 which is a movable pulley pivotally mounted within yoke 137. Yoke 137 is connected to heater casing 130 by means of the aforementioned cables 129 which are entrained over pulleys 138. Pulleys 138 are also pivotally mounted on frame portion 133, as is pulley 135.

When pulleys 138 are free to rotate and cables 129 are free to pass over pulleys 138, heater casing 130 is moved upwardly (as seen in FIG. 21) under the influence of counterweight 127. During this movement pulley 136 moves to the left, as seen in FIG. 21, toward securement point 134 where cable 128 is secured, thereby shortening the vertical portion of cables 129. To further guide the upward movement of heater casing 130 under the influence of counterweight 127, heater casing 130 is provided with an upwardly extending guide rod 139 which is slidably mounted within a bearing sleeve 140 provided in the extreme end portion of frame portion 133. Opposing the tendency of counterweight 127 to raise heater casing 130 is a solenoid and plunger mechanism, generally designated 141, which is carried by frame portion 133 and which normally exerts pressure against guide rod 139 to immobilize it against vertical movement within guide sleeve 140. De-energization of solenoid mechanism 141 permits guide rod 139 to freely move upwardly under the influence of counterweight 127 acting through the pulley and cable system so as to raise heater casing 130 upwardly and away from conveyor 15, thereby permitting ready access to the latter. Guide rod 139 is provided with a handle 142 adjacent the top or end portion of guide rod 139 to permit manual downward movement of guide rod 139 and re-energization of solenoid mechanism 141.

In the illustration given, the heating station is shown sufficiently long, i.e., in the direction of travel of conveyor 15, to cover eight dies 25. Immediately following emergence from the heating station, conveyor 15 moves collar 11 with heated film sealed thereto to a deep drawing station, seen in FIGS. 1 and 6, and set forth in more detail in FIGS. 25–30.

*Draw Operation*

As indicated immediately above, collar 11 with its attached heated film 16 is subjected to a deep drawing operation. A deep draw is conventionally defined to be that type of deformation of a planar film wherein the depth of draw is equal to or greater than the shortest planar dimension of the film from which it was drawn. Providing the deep draw necessary for forming the reversible pocket 12 of container 10 poses a problem in that it is necessary that the drawn or stretched film be relatively uniform throughout the entire area of the drawn portion. Conventional deep drawing techniques often result in a film that is much thinner at the deepest portion of the draw than at the secured edges. Variations in thickness of reversible pocket 12 are not only productive of loss of resolution of surface ornamentation 13 but also might produce rupture of the pocket 12 and subsequent complete loss of the container and product.

To a certain extent this difficulty has been overcome by vacuum drawing of thermoplastic films. However, the prior techniques of vacuum drawing depended on the even and positive contact between the peripheral sealing members holding the film to be drawn. This type of sealing is easily maintained when normal wood or metal dies are used. In addition, dies for maintaining the peripheral seal generally were of substantially greater width in the sealed area than the paper board collar 11 employed here. The great stress imposed by vacuum drawing on thermoplastic films require peripheral seals of a width of the order of ⅛ inch or greater which is unattainable in the production contemplated according to this invention where paper board collars of less than 1/16 inch in width are employed as providing one of the sealing edges. Further, the employment of cardboard collars 11 as one of the mating edges to provide this seal makes sealing difficult since often the cardboard is uneven or soft in the abutting edge employed for the seal.

I am able to overcome the problem of providing a deep and uniform draw by employing a mechanical plunging means traveling part-way into the associated female die to produce a partial deformation of a planar thermoplastic film. The mechanical plunging means produces stress primarily in the perimetric area inward of the seal, but spaced from the center and deepest portion of the draw and, unexpectedly, without tending to upset the seal as is the case in vacuum drawing. The partial mechanical deformation followed by vacuum drawing produces a uniformly drawn film without affecting the perimetric seal. This operation is shown schematically in a series of figures (FIGS. 27–30) which show some of the operative components of the drawing station of the machine in different operative positions, the drawing station of the machine being shown in greater detail in FIGS. 25 and 26.

Referring now to the drawing and particularly FIGS. 27–30 which show a sequence of movements producing a uniform deep draw, it is to be seen that a planar film 16 is positioned over a collar 11 carried by die 25 mounted on crossbar 27. In FIG. 27 a transverse beam member 143 is seen spaced above and in alignment with crossbar 27. As indicated in FIGS. 28–30, beam member 143 is reciprocable in a vertical path to a position closer to crossbar 27 and hence collar 11. Associated with beam member 143 by a structure to be described hereafter, are four pressing shoes 144. Shoes 144 are so arranged and constructed as to provide mating bearing surfaces 144a, which when brought into contact with film 16 as seen in FIG. 28 are substantially in register with the upper perimetric edges of four collars 11. The mating bearing surface 144a of each shoe 144, in the illustration given, is provided with a rubber gasket 144b which cooperates with collar 11 to effectuate a tight clamping action on film 16. Depending from beam member 143 are four male die members 145 which, when moved to their lowermost position as seen in FIGS. 29 and 30, extend partway into female dies 25. Each male die member 145 can conveniently be equipped with a heating element in the chamber designated 146 through suitable electrical connections (not shown) which can be provided if additional heating during the drawing operation is considered desirable.

Positioned below crossbar 27 is a lower beam member 147. Lower beam member 147, like upper beam member 143, is in spaced relation to crossbar 27 and is aligned therewith. Lower beam member 147 carries a vacuum pipe 148 which is provided with four suction cups 149 extending upwardly from pipe 148 and toward crossbar 27. Lower beam member 147 is also provided with four pairs of upwardly extending arms 150 which are turned slightly outwardly at their unsecured ends as at 150a. Crossbar 27 is provided with a vertical opening 27a which is substantially aligned with the openings in suction cups 149. A plurality of small openings 25b are provided in female die 25 permitting the influence of vacuum existing in pipe 148 to be manifested within female die 25 when suction cup 149 is brought into engagement with the bottom surface of crossbar 27. This can be readily appreciated from a consideration of FIG. 30.

The sequence of operations shown in FIGS. 27–30 is achieved through the use of actuating mechanisms shown in FIGS. 25 and 26. In FIG. 25, beam member 143 (only one-half of which is shown) is provided with end extensions, such as are designated 151, which are slidably mounted on shafts 152 secured to housing 24. Also slidably disposed within extensions 151 are guide rods 153 which at their lower ends carry beam 154 supporting pressing shoes 144.

Guide rods 153 are provided with limiting nuts or flanges 153a adjacent their upper ends which limit the downward travel of guide rods 153 within end extensions 151. Upon upward movement of beam member 143 and, therefore, end extensions 151, the upper surface of extensions 151 engage flanges 153a, which elevates pressing shoe beam 154. Relative movement between pressing shoe beam 154 and beam member 143 is permitted by the spacing of flange 153a on guide 153 so that during the downward travel of beam member 143, first pressing shoes 144 engage the four film-equipped collars 11 disposed across conveyor 15. Thereafter, male die members 145 engage and partially deform film 16, as can be appreciated from a comparison of FIGS. 28 and 29.

Vertical reciprocatory movement of beam member 143 is achieved through linkages 155 on each side of housing 24 which are secured to end extensions 151. Linkages 155 are pivotally attached at their lower ends to arms 156. Arms 156 in turn are pivotally connected to torsion tube 157 which is journaled in housing 24. Arms 156 at another point are pivotally connected to a spring-loaded rod 158 which is secured to housing 24 as at 158a. One linkage 155 and its associated arm 156 are pivotally connected to a second linkage 159 which is provided at its unattached end with a cam follower arm 160. Cam follower arm 160 rides on the contour of cam 161 which is keyed to line shaft 23. Cam follower arm 160 is maintained in a positive contact with cam 161 by the pivotal mounting of cam follower arm 160 on frame 17, as at 160a.

Vertical reciprocation of lower beam member 147 is also provided by cam 161 operating through cam follower arm 160 and second linkage 159 and arm 156. Pivotally connected to arm 156 is a third linkage element 162. Third linkage element 162 at its upper end is connected to a cross-head 163 which in turn is secured to lower beam member 147. It is to be appreciated that an identical third linkage element and cross-head are provided on the side of the machine not shown in FIG. 25. Cross-heads 163 are provided with guide openings 163a which receive shafts 152, thus positively maintaining lower beam member 147 in alignment with beam member 143.

As pointed out above, it is important to note that crossbar 27 has the same dimension measured in the direction of conveyor travel as has female die 25. Thus, no abutting surface is provided for the lower perimetric edge of collar 11 on two sides of die 25 such as are provided on the remaining two sides by crossbar 27 and as is indicated by the numeral 163 in FIG. 25. Positive sealing of the lower edge of collar 11 is provided by arms 150, as can be appreciated from a consideration of FIGS. 29 and 30. Without the seal affected by arms 150 pressing the lower portions of two sides of collar 11 against die 25, the satisfactory operation of the vacuum drawing step might be threatened by by-pass of air between collar 11 and die 25.

After the drawing operation has been completed, subsequent advancement of conveyor 15 brings collar 11 into a film-severing station where the continuous film, which to this point extends over a plurality of successive collars 11, is severed.

*Film-Severing Operation*

For a description of the film-severing operation and the mechanism associated therewith, reference is made to FIGS. 31, 32 and 40. In FIGS. 31 and 40, the numeral 164 designates a vertically disposed shaft secured to housing 24, as can be appreciated from FIG 31. Two shafts 164 are provided, each shaft slidably carrying a guide arm 165. Extending between guide arms 165 and slidably mounted thereon for movement transverse of the machine is beam member 166. Through vertical reciprocation of guide arms 165, beam member 166 is raised and lowered. The vertical reciprocation of guide arms 165 is achieved through linkages 167 which are pivotally connected at one end of each to guide arms 165 and at the other end to arms 168. Arms 168 are pivotally secured to torsion tube 169 which is disposed transverse of the machine and is suitably journaled in housing 24. Also pivotally secured to arms 168 are spring-loaded rods 170, secured at their other ends to housing 24 as at 170a. Pivotally secured to the one linkage 167 and its associated arm 168 on one side of the machine is a second linkage 171. Second linkage 171 is pivotally secured to a cam follower 172 (best seen in FIG. 31) which rides on the periphery of cam 173, cam 173 being keyed to shaft 23. Providing positive following for cam follower 172 on cam 173 is cam follower arm 172a which is pivotally secured at one end to both cam follower 172 and second vertical linkage 171, while at the other end cam follower arm 172a is pivotally secured to frame 17 as at 172b. Through the action of cam follower 172 following cam 173, vertical reciprocation of beam 166 is provided through linkages 171 and 167.

A horizontal movement of beam 166 on guide arms 165 is provided through a second cam and linkage arrangement. The linkage and cam arrangement providing for horizontal reciprocation of beam 166 includes first horizontal linkage 174 pivotally secured at one end to beam 166 and at the other end to second horizontal linkage 175 (best seen in FIG. 31). Second horizontal linkage 175 is pivotally attached at its opposite end to housing 24 by member 176. Second horizontal linkage 175 is provided with an integral extension arm 177 which is equipped with cam follower 178. Cam follower 178 rolls on the contour of cam 179 which is keyed to line shaft 23.

Beam 166 carries four blades 180 in holders 180a as can be best seen in FIG. 32. Each holder 180a is provided with a thumb screw 181 to permit ready changing of blades 180. Through the actuation of cam followers 172 and 178 by cams 173 and 179, respectively, beam 166 is caused to move in a rectilinear path to draw the sharpened edges of blades 180 transverse to the travel of conveyor 15 and thereby sever webs of film 16.

Alternatively, it is possible to achieve severing of webs by means of a hot wire (heated as by electricity) which is moved into abutting relation with the webs of film by reciprocation in a vertical fashion of beam 166. In such case the horizontal movement of beam 166 achieved through cam 179 can be eliminated.

Inasmuch as the above-described severing operation does not trim web 16 flush with the edge of collar 11, and since additional strength of securement of pocket 12 can be achieved by sealing the overlapping edges of film 16 to the outer side walls of collar 11, I provide in the next station a fold-down operation which is shown in detail in FIGS. 33–35.

*Fold-Down Operation*

Referring now to FIG. 33 which shows a fragmentary section through the machine at the fold-down station, the numeral 182 designates a vertically disposed shaft slidably mounted on housing 24. A similar shaft is provided on the unshown portion of the machine. Shafts 182 are slidably mounted in guide sleeves 183 which are secured by suitable bolts 184 to housing 24. Fixed to shafts 182 as by pin 185 are beam extensions 186. Beam extensions 186 in turn are fixed to transverse beam 187 and also are pivotally connected to linkage 188. Linkage 188 is pivotally secured to arm 189 and second linkage 190. Arm 189 is secured to torsion tube 191 which is suitably journaled in housing 24. Linkage 190 is provided with cam follower 192 which follows the contour of cam 193, cam 193 being fixed to line shaft 23.

Beam 187 is provided with eight pairs of depending rods 194, each pair being arranged lengthwise of the machine. Each two pairs of rods 194 carry a fold-down shoe 195. Shoes 195 are urged downwardly on rods 194 by the action of springs 196. Shoes 195 can be conveniently provided with heater elements, such as electrically energized elements, by placing the same in chamber 197.

The bottom contour of shoe 195 is provided with a perimetric step as at 198 which permits engagement of shoe 195 with both the top perimetric edge of a collar 11 mounted on die 25 and also the outer side walls as at 198a. When shoe 195 is heated, a secure bond can be made between the folded down portion of film 16 and the outer side wall 198a of collar 11.

After containers 10 provided by collars 11 and film 16 have passed through the fold-down station, they are ready for removal from the machine which is automatically provided at the eject station, as seen on FIGS. 1 and 6, and the apparatus for which is shown in greater detail on FIGS. 36–39.

*Eject Operation*

Referring now to FIG. 36, the numeral 199 represents a vertically disposed shaft secured to housing 24 by a bracket 200. Slidably mounted on shaft 199 is a bearing bracket 201. Although only one side of housing 24 is shown in FIG. 36, it is to be appreciated that a similar arrangement of elements is found on the side not shown. Bearing bracket 201 is caused to reciprocate vertically through linkage 202 which is pivotally connected at one end to bracket 201 and at the other end to arm 203. Arm 203 is also pivotally connected to second linkage 204 which at its other end is provided with a cam follower 205. Cam follower 205 bears against the contour of cam 206 which is keyed as at 207 to line shaft 23. Cam 206 is provided with a cam follower guard 208 that insures positive following of the contour of cam 206 by cam follower 205. Cam follower 205 and linkage 204 are pivotally connected to cam follower arm 209 which at its other end is pivotally connected to frame 17 as at 210.

Arm 203 is fixed to torsion tube 211 which extends transverse of housing 24 and is journaled therein as at 211. Torsion tube 211 is provided with an arm and linkage arrangement on the side not shown similar to that designated 202 and 203 in FIG. 36.

Bearing brackets 201 support therebetween a transverse beam 213 which can also be seen in FIGS. 38 and 39.

Beam 213 is provided with four pairs of upwardly extending arms 214. As beam 213 is raised under the action of cam 206 and through the associated linkage including linkages 202 and 204, arms 214 are also moved upwardly to slide on the lateral sides of crossbar 27 and die 25, as can be seen in FIG. 39, thereby raising collar 11 from its position on and about die 25. Simultaneously, air under pressure is supplied in pipe 215 which issues through nozzle 216 to force pocket 12 from its position within die 25. When collar 11 is raised to the position shown in FIG. 39, a laterally directed jet of air such as is indicated in FIG. 1 can conveniently be employed to move the four collars 11 laterally and off of conveyor 15.

Pipe 215 can be conveniently mounted on housing 24 over beam 213 and intermediate arms 214. Through suitable connections, the upward movement of beam 213 can be caused to open a valve (not shown) associated with pipe 215 to permit air to issue through nozzles 216, as seen in FIG. 39. The upward movement of beam 213 under the influence of linkages 202 and 204 can simultaneously perform the adhesive-applying operation mentioned previously by raising adhesive applicator 86 into contact with the lower exposed perimetric edge of collar 11.

While in the foregoing specification an embodiment of the invention has been described in considerable detail for the purpose of adequately disclosing the invention, it will be appreciated that those skilled in the art may vary such details considerably without departing from the spirit and principles of the invention.

I claim:

1. In a machine for producing an open-sided rectangular container having a reversible pocket suspended therein from the edges of one of said open sides, a frame movably supporting a generally horizontal endless conveyor, said conveyor comprising a plurality of crossbars each equipped with means for supporting a container, means at one end of said conveyor for mounting containers on said crossbars, means at the other end of said conveyor for sequentially uniting a portion of a continuous plastic web to the perimetric edges of the mounted containers, said conveyor traveling from said other end to said one end in the top run thereof, means in said top run for forming pockets in said containers from said web while said web exists in the form of a continuous film united to said edges of a plurality of containers spaced along the length of conveyor travel, and means on said frame intermediate said uniting and pocket forming means for heating said web when the same is united to the edges of said containers.

2. In a machine for producing rectangular containers each equipped with a pair of open sides and having a reversible pocket suspended therein from the upstanding perimetric edges of one of said open sides, a frame, an endless conveyor movably mounted in said frame, said conveyor having a plurality of parallel crossbars each equipped with means for supporting a container of the character specified, means on said frame for sequentially pressing unsevered portions of a continuous planar thermoplastic film into containers supported on said crossbars, said pressing means being equipped with a male die for partially deforming said film and with a female die having vacuum drawing means associated therewith for drawing said film into contact with said female die, means on said frame adjacent to and preceding said pressing means in the path of conveyor travel for heating said film, and means on said frame adjacent to and preceding said heating means in the path of conveyor travel for uniting portions of said film to the upstanding perimetric edges of said containers.

3. A machine according to claim 2 in which each of said crossbars is equipped with means for mounting a plurality of containers in spaced-apart, aligned relation.

4. In a machine for producing rectangular containers each equipped with a pair of open sides and having a reversible pocket suspended therein from the upstanding perimetric edges of one of said open sides, a frame, an endless conveyor movably mounted on said frame, said conveyor having a plurality of parallel, spaced-apart crossbars each equipped with means for supporting a plurality of containers in spaced relation, means on said frame for mounting said containers on said crossbars from a stack of collapsed containers, means on said frame subsequent to said mounting means in the path of conveyor travel for contacting a continuous web of thermoplastic film with the upstanding perimetric edges of said containers outstanding from said conveyor, means on said frame subsequent to said contacting means in the path of conveyor travel for heat-sealing portions of said web of thermoplastic film to said perimetric edges, means on said frame subsequent to said heat-sealing means in the path of conveyor travel for heating said continuous web of thermoplastic film, means on said frame subsequent to said heating means in the path of conveyor travel for deforming said film into said containers while said film exists as a continuous web, said deforming means including a male die for partially deforming said film and a female die having vacuum drawing means associated therewith for drawing said film into contact with said female die, means on said frame subsequent to said deforming means in the path of conveyor travel for severing said film between successive crossbars, and means on said frame subsequent to said severing means in the path of conveyor travel for removing said containers from said crossbars.

5. A machine for forming containers each equipped with an open end defining upstanding perimetric edges, each container having a reversible thermoplastic pocket suspended therein, comprising a frame, a horizontally-extending endless conveyor movably mounted on said frame and having upper and lower runs, means for intermittently advancing said conveyor, said conveyor being equipped with transverse bars each capable of supporting a plurality of rectangular containers thereon, means for successively mounting containers on successive crossbars during interruption of advancement of said conveyor, a web roll of thermoplastic web film supported on said frame adjacent the beginning of said upper run, engaging means on said frame for bringing a continuous web of thermoplastic film into engagement with the upstanding perimetric edges of containers adjacent the beginning of said upper run, means for uniting the film to said edges, means for heating said film, means for deforming said film into containers, means for severing said web between successive transverse bars, and means for removing said containers from said conveyor, said uniting means, film-heating means, film-deforming means, film-severing means, and container-removing means all being mounted on said frame for sequential operation upon containers supported upon the upper run of said conveyor, said means for bringing a web into engagement with said container perimetric edges including a tension roll and a pressure roll bearing on said web, said pressure roll also bearing against said container perimetric edges, said uniting means being interposed between said tension roll and severing means and being spaced therefrom, whereby a plurality of containers are disposed along the length of said conveyor and secured to said web.

6. A machine according to claim 5, in which said film-engaging means, said uniting means, said deforming means, said severing means, and said container-removing means are all actuated from a common power source during interruption of advancement of said conveyor.

7. The machine of claim 5 in which said film-deforming means comprises a female die positioned within said container, said die being apertured, with the apertures being communicated with vacuum-providing means, and a male die equipped with means for mechanically partially deforming said film prior to application of vacuum to said female die apertures.

8. In a machine for producing rectangular containers equipped with open sides defining upstanding perimetric edges, each container having a reversible pocket suspended therein from the upstanding perimetric edges of one of said open sides, a frame, an endless conveyor movably mounted on said frame, said conveyor having a plurality of parallel, spaced-apart crossbars each equipped with means for supporting a container of the character specified, means for mounting rectangular containers on said crossbars adjacent one end of said conveyor, means on said frame adjacent the other end of said conveyor and on the top run thereof for contacting a continuous planar thermoplastic film with the upstanding perimetric edges of a container while said edges are equipped with adhesive, means on said frame for sealing portions of said film to said adhesive-equipped edges, means on said frame for heating said film, means on said frame for pressing portions of said film into a container to provide a reversible pocket, said pressing means including a male die for partially deforming said film and a female die having vacuum drawing means associated therewith for drawing said film into contact with said female die, and film-severing means on said frame, said contacting means, sealing means, heating means, pressing means, and severing means all being sequentially arranged relative to the direction of conveyor travel.

9. The machine of claim 8 in which said male die is reciprocably mounted on said frame, said male die being equipped with means for pressing against said upstanding perimetric edges.

10. In a machine for forming containers eqpuipped with open ends defining upstanding perimetric edges, each container having a reversible pocket suspended therein from said upstanding perimetric edges, a frame, an endless conveyor movably mounted on said frame, said conveyor having a plurality of parallel, longitudinally spaced-apart crossbars, each of said crossbars being equipped with means adapted to support a container, means on said frame for pressing a continuous planar film into a container so supported, said pressing means being equipped with a male die for partially deforming said film and with a female die having vacuum drawing means associated therewith for drawing said film into contact with said female die, means on said frame spaced in the direction of conveyor travel from said pressing means for severing said film between adjacent crossbars, means on said frame spaced opposite the direction of conveyor travel from said pressing means for securing said film to said upstanding perimetric edges of said container, and means on said frame intermediate said pressing and securing means for heating said film.

11. The machine of claim 10 in which said machine is equipped with film supply means, said film supply means being spaced opposite the direction of conveyor travel from said film securing means and positioned adjacent one end of the travel of said conveyor.

References Cited in the file of this patent

UNITED STATES PATENTS

| | | |
|---|---|---|
| 1,492,510 | De Escobales | Apr. 29, 1924 |
| 2,142,445 | Helwig | Jan. 3, 1939 |
| 2,230,189 | Ferngren | Jan. 28, 1941 |
| 2,282,423 | Kopitke | May 12, 1942 |
| 2,295,066 | Weikert | Sept. 8, 1942 |
| 2,307,114 | Dichter | Jan. 5, 1943 |
| 2,328,798 | Gardner | Sept. 7, 1943 |
| 2,531,539 | Smith | Nov. 28, 1950 |
| 2,631,939 | Peters | Mar. 17, 1953 |
| 2,736,065 | Wilcox | Feb. 28, 1956 |
| 2,762,274 | Kerr | Sept. 11, 1956 |
| 2,794,374 | Gentry | June 4, 1957 |
| 2,814,074 | Butzko | Nov. 26, 1957 |
| 2,927,409 | Heyer | Mar. 8, 1960 |